United States Patent
Haghighat et al.

(10) Patent No.: US 12,355,523 B2
(45) Date of Patent: Jul. 8, 2025

(54) METHODS, APPARATUSES AND SYSTEMS DIRECTED TO SOUNDING REFERENCE SIGNAL ANTENNA SWITCHING

(71) Applicant: InterDigital Patent Holdings, Inc., Wilmington, DE (US)

(72) Inventors: Afshin Haghighat, Ile-Bizard (CA); Moon Il Lee, Melville, NY (US); Loic Canonne-Velasquez, Dorval (CA); Janet Stern-Berkowitz, Little Neck, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 117 days.

(21) Appl. No.: 18/271,953

(22) PCT Filed: Dec. 15, 2021

(86) PCT No.: PCT/US2021/063547
§ 371 (c)(1),
(2) Date: Jul. 12, 2023

(87) PCT Pub. No.: WO2022/154925
PCT Pub. Date: Jul. 21, 2022

(65) Prior Publication Data
US 2024/0187058 A1    Jun. 6, 2024

Related U.S. Application Data

(60) Provisional application No. 63/136,329, filed on Jan. 12, 2021, provisional application No. 63/228,720, (Continued)

(51) Int. Cl.
*H04B 7/06* (2006.01)
*H04B 7/0404* (2017.01)
*H04L 25/02* (2006.01)

(52) U.S. Cl.
CPC ......... *H04B 7/0604* (2013.01); *H04B 7/0404* (2013.01); *H04L 25/0226* (2013.01)

(58) Field of Classification Search
CPC . H04B 1/713; H04B 7/00; H04B 7/06; H04B 7/08; H04B 7/0404; H04B 7/0413;
(Continued)

(56) References Cited

U.S. PATENT DOCUMENTS

| | | | |
|---|---|---|---|
| 2019/0356445 A1* | 11/2019 | Manolakos | H04B 7/0805 |
| 2022/0337362 A1* | 10/2022 | Jiang | H04L 5/0051 |
| 2023/0275629 A1* | 8/2023 | Wang | H04W 24/02 |
| | | | 375/262 |

FOREIGN PATENT DOCUMENTS

| | | |
|---|---|---|
| EP | 3745764 A1 | 12/2020 |
| WO | WO 2018177410 A1 | 10/2018 |

OTHER PUBLICATIONS

3rd Generation Partnership Project (3GPP), "Technical Specification Group Radio Access Network; NR; Physical layer procedures for control (Release 16)", 3GPP TS 38.213 V16.0.0, Dec. 2019, 146 pages.
(Continued)

*Primary Examiner* — Shawkat M Ali
(74) *Attorney, Agent, or Firm* — Volpe Koenig

(57) ABSTRACT

Methods, apparatuses, systems, etc., directed to sounding reference signal (SRS) antenna switching are disclosed herein. In an embodiment, a WTRU may transmit information indicating existence of a sounding reference signal (SRS) power imbalance for at least one transmit and receive (xTyR) antenna configuration in a set of xTyR antenna configurations. For example, the WTRU may receive a request to report SRS power imbalance information. For example, the WTRU may transmit the SRS power imbalance information indicating, for at least one SRS resource set associated with the at least one xTyR antenna configuration,
(Continued)

(i) one or more impacted SRS resources in the at least one SRS resource set and (ii) one or more power imbalance values for the one or more impacted SRS resources.

20 Claims, 18 Drawing Sheets

Related U.S. Application Data filed on Aug. 3, 2021, provisional application No. 63/248,689, filed on Sep. 27, 2021.

(58) Field of Classification Search
CPC ....... H04B 7/0417; H04B 7/0604; H04L 5/00; H04L 25/02; H04L 25/0226; H04W 8/22; H04W 52/02; H04W 52/14; H04W 52/22; H04W 52/32; H04W 72/04; H04W 72/51; H04W 76/27

USPC ........ 370/280, 329; 375/219, 260, 262, 267, 375/295, 316

See application file for complete search history.

(56) References Cited

OTHER PUBLICATIONS

3rd Generation Partnership Project (3GPP), "Technical Specification Group Radio Access Network; NR; Physical layer procedures for data (Release 16)", 3GPP TS 38.214 V16.0.0, Dec. 2019, 147 pages.
Interdigital, Inc., "Remaining Issues on SRS Enhancements", 3GPP Tdoc R1-2106645, 3GPP TSG RAN WG1 #106e, e-Meeting, Aug. 16, 2021, 11 pages.
Qualcomm Incorporated, "Discussion on SRS Enhancements", 3GPP Tdoc R1-2107328, 3GPP TSG RAN WG1 #106e, e-Meeting, Aug. 16, 2021, 29 pages.

* cited by examiner

METHODS, APPARATUSES AND SYSTEMS DIRECTED TO SOUNDING REFERENCE SIGNAL ANTENNA SWITCHING

CROSS-REFERENCE TO RELATED APPLICATIONS

This application is a U.S. National Stage Application under 35 U.S.C. § 371 of International Patent Application No. PCT/US2021/063547, filed Dec. 15, 2021, which claims the benefit of U.S. Provisional Patent Application Nos. (i) 63/136,329 filed Jan. 12, 2021, (ii) 63/228,720 filed Aug. 3, 2021, and (iii) 63/248,689 filed Sep. 27, 2021, the contents of each of which is incorporated herein by reference.

BACKGROUND

The present disclosure relates to network communications, including, but not exclusively, to methods, apparatuses, systems, etc. directed to antenna switching in wireless networks.

SUMMARY

Methods, apparatuses, systems, etc., directed to sounding reference signal (SRS) antenna switching are disclosed herein.

In an embodiment, a WTRU may transmit information indicating existence of a sounding reference signal (SRS) power imbalance for at least one transmit and receive (xTyR) antenna configuration in a set of xTyR antenna configurations. For example, the WTRU may receive a request to report SRS power imbalance information. For example, the WTRU may transmit the SRS power imbalance information indicating, for at least one SRS resource set associated with the at least one xTyR antenna configuration, (i) one or more impacted SRS resources in the at least one SRS resource set and (ii) one or more power imbalance values for the one or more impacted SRS resources.

In an embodiment, SRS antenna switching may be performed in any of a first operation mode and a second operation mode. In a case where the WTRU is operating in the first mode, SRS antenna switching may be performed according to a transmit (Tx) dimension and a receive (Rx) dimension of the WTRU. In a case where the WTRU is operating in the second operation mode, SRS antenna switching may be performed according to a WTRU coherence capability and the Rx dimension. For example, in the second operation mode, (e.g., only) a subset of the available Tx chains may be used for SRS transmission at a time. For example, in the second operation mode, SRS antenna switching may be performed for one subset of Tx chains during an ongoing transmission in another subset of Tx chains.

Although various embodiments are described and/or claimed herein in which an apparatus, system, device, etc. and/or any element thereof is configured to carry out an operation, process, algorithm, function, etc. and/or any portion thereof, it is to be understood that any embodiments described and/or claimed herein assume that any apparatus, system, device, etc. and/or any element thereof carries out any operation, process, algorithm, function, etc. and/or any portion thereof (and vice versa).

BRIEF DESCRIPTION OF THE DRAWINGS

A more detailed understanding may be had from the following description, given by way of example in conjunction with the accompanying drawings. Figures in such drawings, like the detailed description, are examples. As such, the Figures and the detailed description are not to be considered limiting, and other equally effective examples are possible and likely. Furthermore, like reference numerals in the figures indicate like elements.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application. In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein.

Example Communications Networks

Figure 1A:
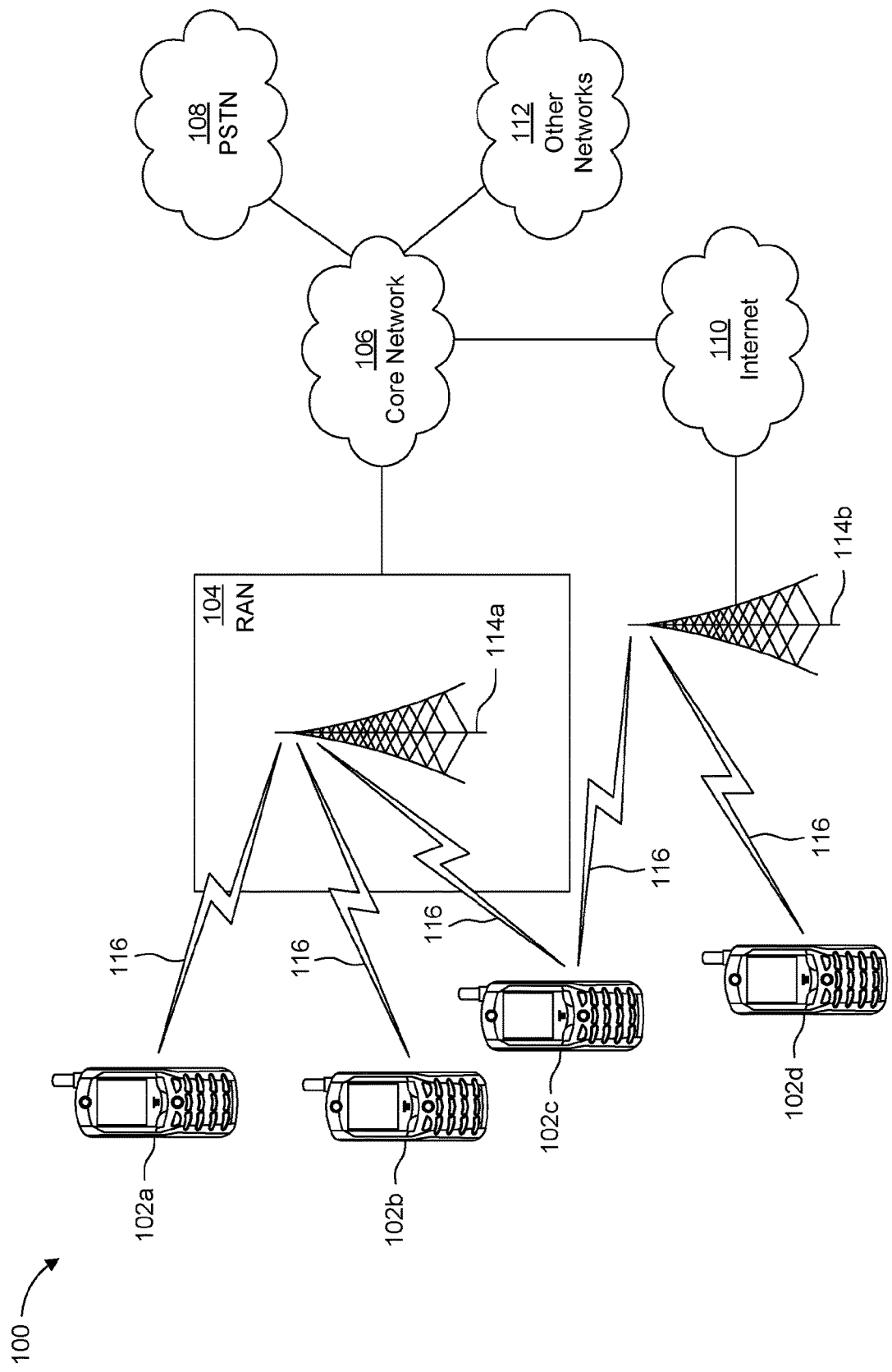
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or an "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, an NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR, etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing an NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
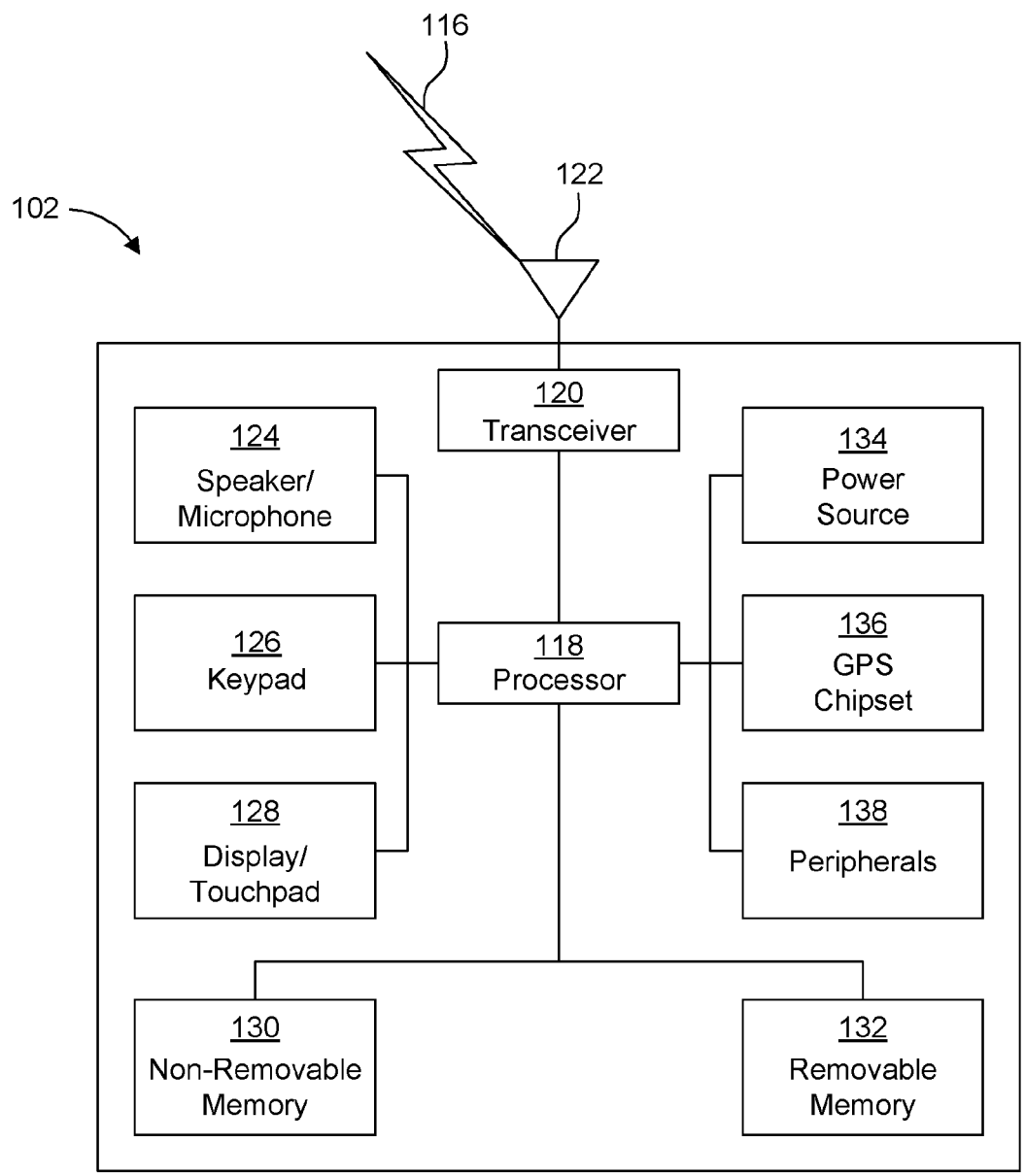
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general-purpose processor, a special-purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full-duplex radio for which transmission and reception of some or all of the signals (e.g., associated with particular subframes for both the UL (e.g., for transmission) and downlink (e.g., for reception) may be concurrent and/or simultaneous. The full-duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
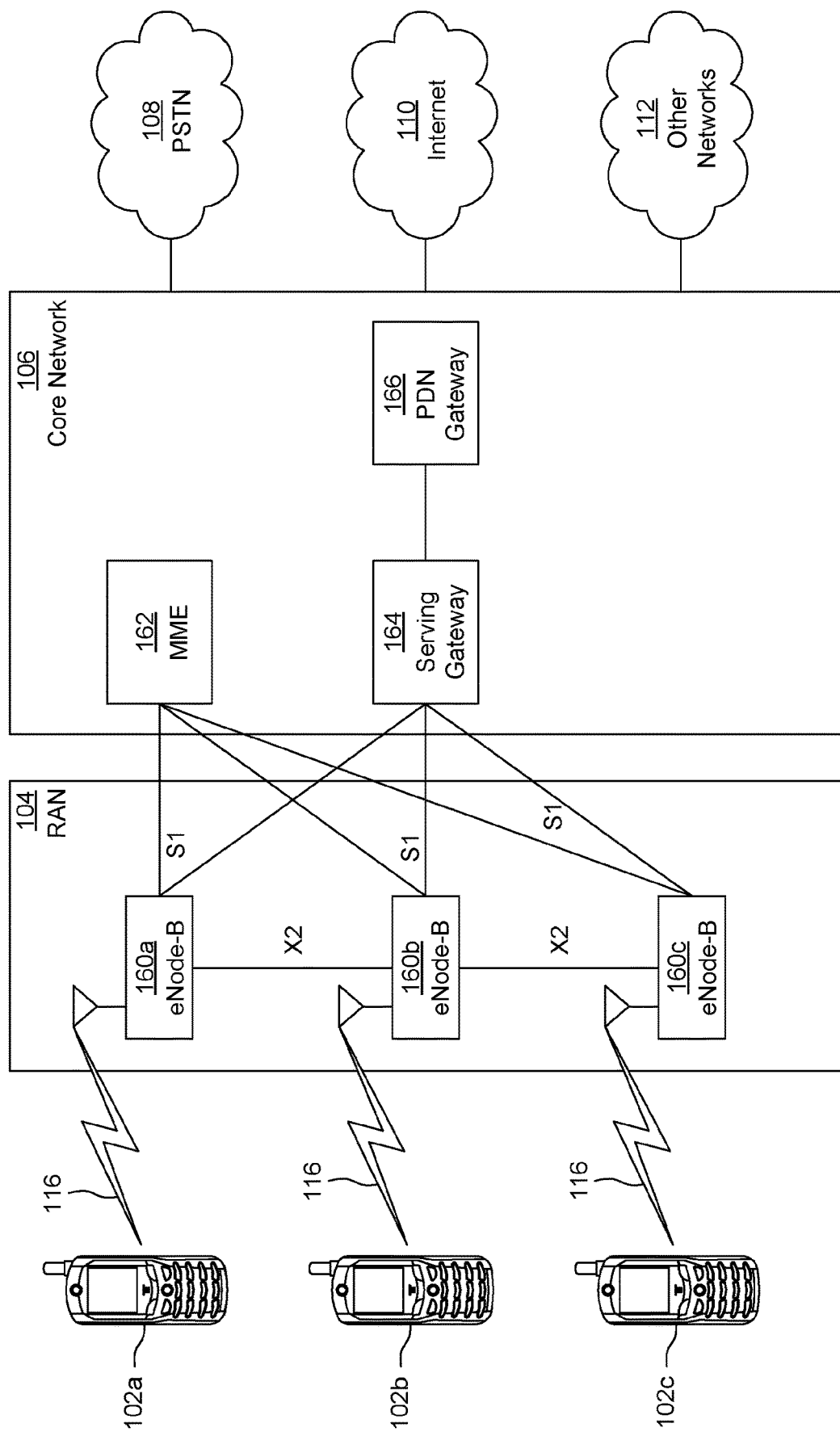
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHZ, and/or 160 MHz wide channels. The 40 MHZ, and/or 80 MHZ, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing and time domain processing may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHZ, 2 MHZ, 4 MHZ, 8 MHZ, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by an STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHz, 8 MHZ, 16 MHZ, and/or other channel bandwidth operating modes. Carrier sensing and/or Network Allocation Vector (NAV) settings may depend on the status of the primary channel. If the primary channel is busy, for example, due to an STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
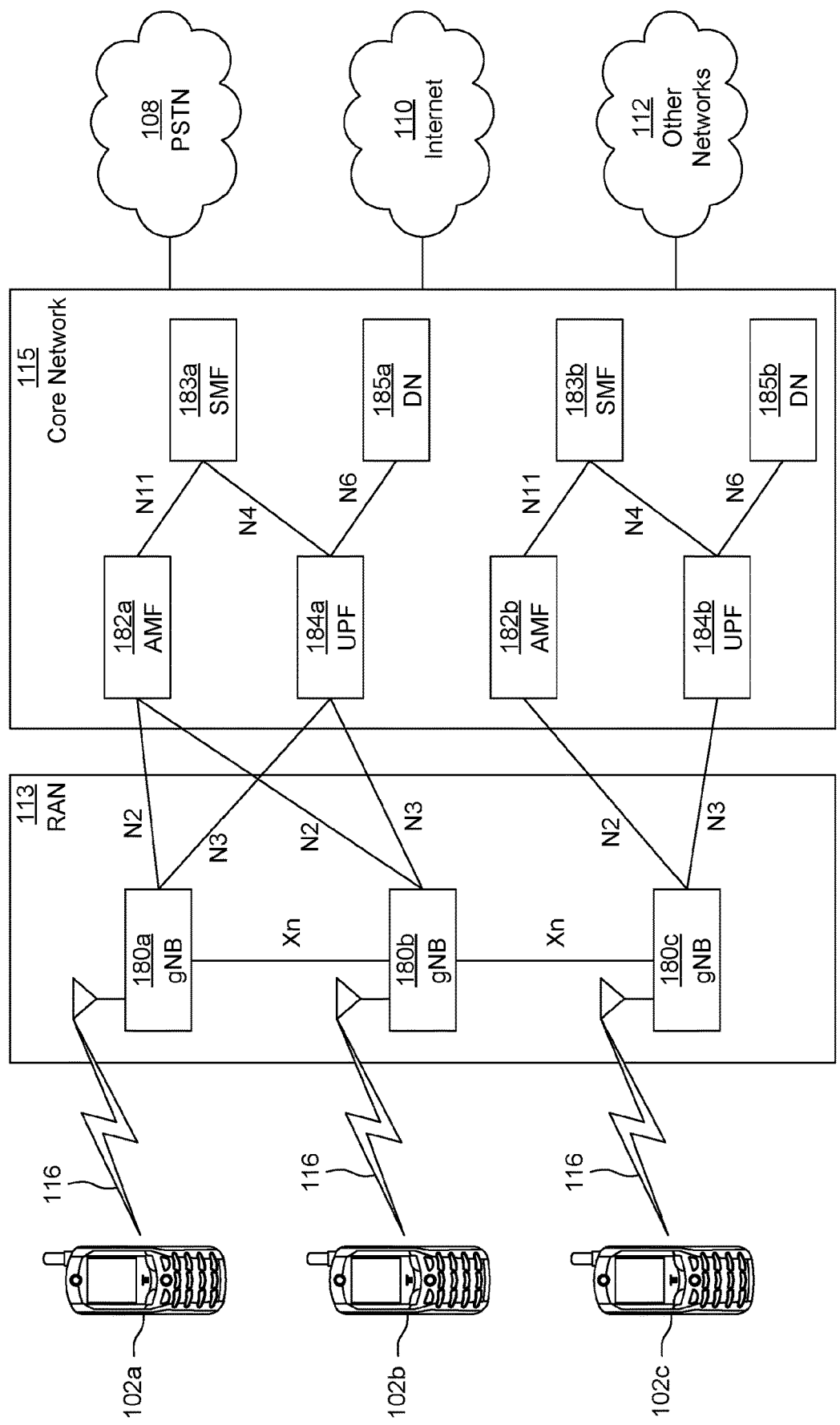
FIG. 1D is a system diagram illustrating a further example RAN and a further example of a CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the WTRUs 102a, 102b, 102c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements is depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized by WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 182 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184a, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented or deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented or deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

SRS-Based Methods Examples

For example, sounding reference signal (SRS) may be used for uplink channel measurement. In another example, SRS transmission may be used to assist downlink channel state information (CSI) estimation for any of partial and (e.g., fully) reciprocal channels. In yet another example, SRS may be used for beam management. SRS may be transmitted through different SRS resources for supporting beam selection by a network element (e.g., a gNB). Embodiments described herein may allow to improve MIMO performances by enabling a dynamic and flexible sounding procedure e.g., with adequate capacity and coverage. Throughout embodiments described herein the terms "serving base station", 'base station" and "gNB" may be used interchangeably to designate a network element acting as a serving base station. Embodiments described herein are not limited to gNBs and are applicable to any other type of serving base stations.

Mobile communications are in continuous evolution and are already at doorsteps of its fifth incarnation, which is called $5^{th}$ Generation, and may be referred to herein as any of 5G, NR, collectively NR. In NR Release 16, a WTRU may be configured with (e.g., may receive configuration information indicating) any number of SRS resource sets (which may be referred to herein as SRS-ResourceSet). An SRS resource set may include up to K SRS resources, where K may be an integer number and may be based on a WTRU capability. An SRS resource set may be set for different applications (e.g., usage) such as e.g., any of beamManagement, codebook, nonCodebook and antennaSwitching. For example, the time domain behavior of SRS resource configuration may be indicated by the (e.g., higher layer) parameter resourceType. For example, the time domain behavior may be configured (e.g., indicated as configuration information) as any of periodic (e.g., regular), semi-persistent and aperiodic. In NR Release 16, a WTRU may not be configured to have different time domain behaviors, e.g., periodic, semi-persistent. In NR Release 16, a WTRU may not be configured to have different periodicities for SRS resources within a same SRS resource set.

For example, an aperiodic SRS may have a higher transmission priority over any of a periodic and a semi-persistent SRS in a case where the aperiodic SRS is (e.g., triggered to be) transmitted on the same symbol(s). For example, the aperiodic SRS may have priority over the physical uplink control channel (PUCCH), in a case where the aperiodic SRS is (e.g., triggered to be) transmitted on the same symbol, e.g., except in a case where the PUCCH is carrying any of a hybrid automatic repeat request acknowledge (HARQ-ACK), a link recovery request and a schedule request (SR).

SRS Transmission Example for Downlink CSI Estimation

According to embodiments, an application of SRS may be to estimate the downlink CSI. The terms "channel", "channel CSI", and "CSI", collectively CSI may be used interchangeably. In a time division duplex (TDD) system, e.g., based on the principle of channel reciprocity, the downlink CSI, which may be referred to herein as $\tilde{H}_{DL}$, may be obtained (e.g., derived) from the (e.g., estimated) uplink channel, which may be referred to herein as $\tilde{H}_{UL}$ at the gNB (e.g., $\tilde{H}_{DL} = \tilde{H}_{UL}^T$).

Figure 2:
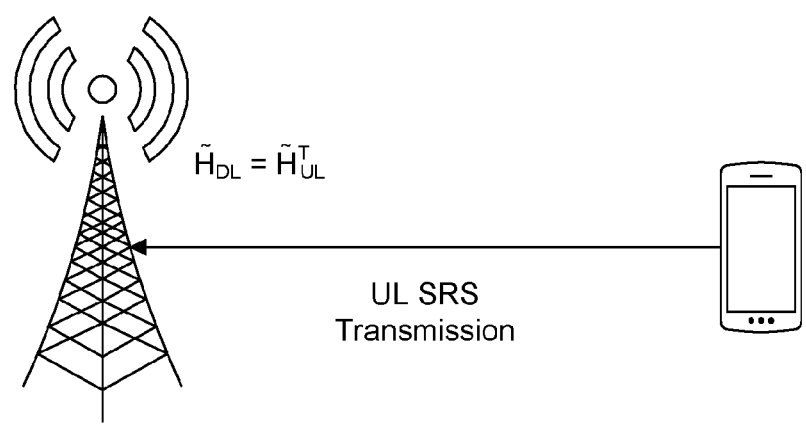
FIG. 2 is a diagram illustrating an example of an SRS transmission for downlink channel estimation in a time division duplex system.

FIG. 2 is a diagram illustrating an example of an SRS transmission for downlink CSI estimation in a TDD system. In a frequency division duplex (FDD) system, considering the separation between the uplink and downlink frequencies may be limited, a similar process may be utilized to gain some information about the downlink CSI information, e.g., covariance matrix of the channel.

For example, a WTRU may comprise a same number of transmit (Tx) and receive (Rx) antennas, where an (e.g., each) antenna may be (e.g., always) connected to a (e.g., same) receive and transmit signal chain. For the WTRU, SRS signal transmission for CSI estimation may be performed in a straightforward manner (e.g., without taking care of receive and transmit signal chain variation).

Throughout embodiments described herein, the terms "transmission", "transmit", collectively "Tx" may be used interchangeably. Throughout embodiments described herein, the terms "reception", "receive", collectively "Rx" may be used interchangeably.

Transmit Antenna Switching Example

For SRS antenna switching, a WTRU may be configured with any number of SRS resource sets with a usage parameter indicating antenna switching (e.g., usage=antennaSwitching). For example, a (e.g., each) SRS resource set may be configured with any number of SRS resources, e.g., according to the number of WTRU antenna ports. For example, an SRS resource may be (e.g., a set of) time and frequency resources transmitted for channel sounding. For example, an SRS resource may be configured by an SRS resource information element and may comprise any of a number of antenna ports, a number of consecutive OFDM symbols (e.g., a sequence), a time resource and a frequency resource. In NR Release 16, several xTyR configurations for SRS antenna switching may be considered (where x and y are integer numbers, e.g., x={1, 2} and y={1, 2, 4}). For example, an SRS resource set may be associated with an antenna configuration for SRS antenna switching. In a 1T2R example, up to two resource sets may be configured where each set may have (e.g., include) two SRS resources transmitted in different symbols, and where each SRS resource in a given set may comprise a single SRS port, and the SRS port of the second resource in the set may be associated with a different antenna port than the SRS port of the first resource in the same set, resulting in two different SRS resource sets associated with two different antenna configurations. More generally, more than one resource sets may be configured (e.g., indicated via configuration information) where a set may have (e.g., include) any number of SRS resources transmitted in different symbols, and where a (e.g., each) SRS resource in a given set may comprise any number of SRS ports. Different SRS resource sets may be associated with different antenna configurations for SRS antenna switching, where, for example, the SRS port(s) of a first resource of a first SRS resource set may be associated with different antenna port(s) than a first resource of a second SRS resource set.

Throughout embodiments described herein, the terms "antenna configuration", "antenna configuration for SRS antenna switching" and "xTyR antenna configuration" may be used interchangeably to designate an antenna configuration for SRS antenna switching, indicating a set of antenna ports that may be used as any of Tx antenna ports and Rx antenna ports, depending on different switching configurations.

Throughout embodiments described herein the terms "SRS transmission", "transmitted SRS", "SRS resource transmission" and "transmitted SRS resource" may be used interchangeably to designate a (e.g., sounding reference signal) transmission that may be transmitted in an SRS (e.g., time/frequency) resource.

Figure 3:
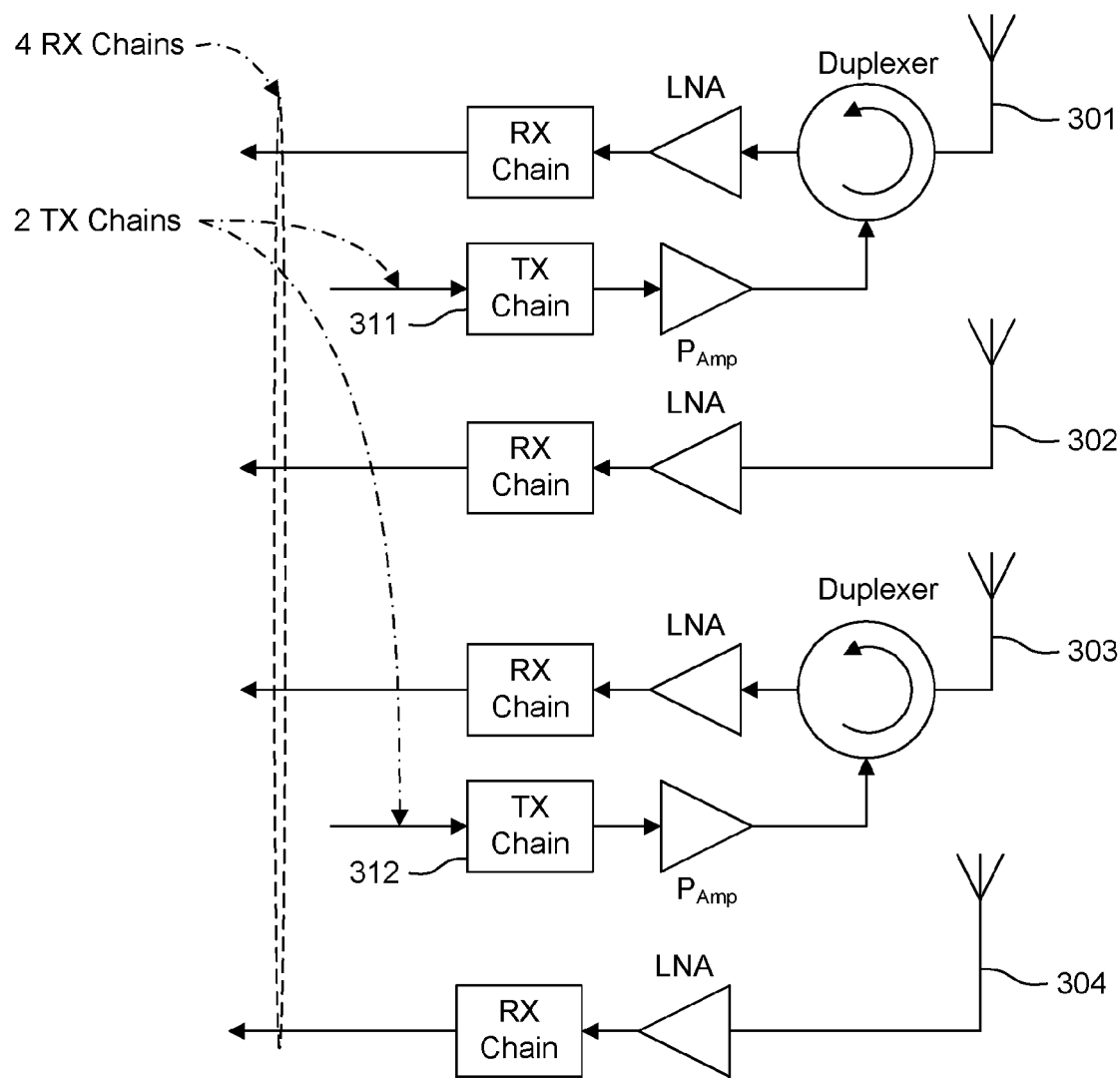
FIG. 3 is a diagram illustrating an example of a WTRU Rx/Tx architecture with four Rx antennas and two Tx antennas.

FIG. 3 is a diagram illustrating an example of a WTRU Rx/Tx architecture with four Rx antennas and two Tx antennas (2T4R WTRU). As illustrated in FIG. 3, two of the four available Rx antennas 301, 302, 303, 304 may be connected to the Tx chains 311, 312 at a time. Transmit antenna switching where an available Tx chain 311, 312 of a WTRU may be switched to different Rx antennas 301, 302, 303, 304 in the WTRU may allow to support SRS-based downlink CSI estimation in WTRUs with xTyR (x<y) architectures.

Figure 4:
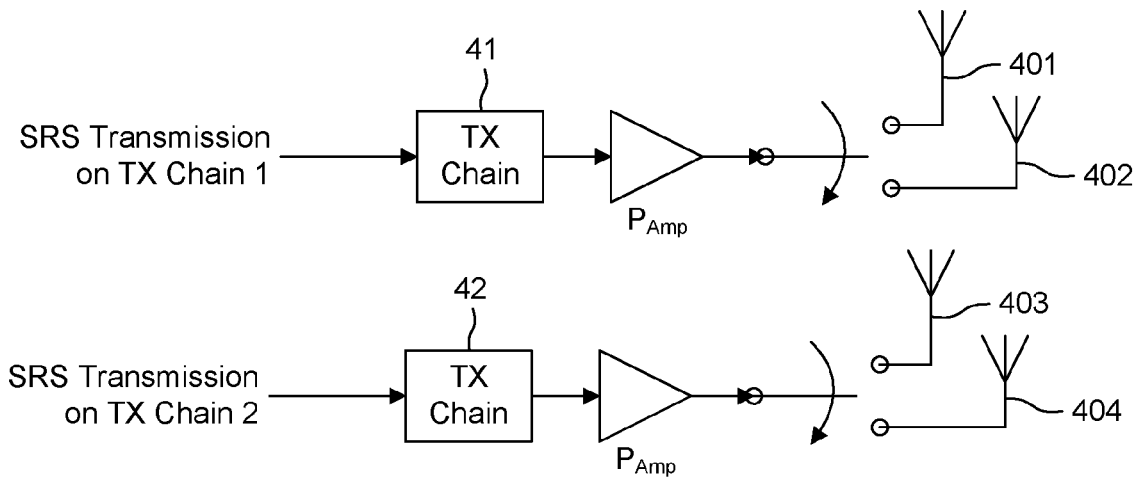
FIG. 4 is a diagram illustrating an example of a transmit antenna switching in a 2T4R WTRU.

FIG. 4 is a diagram illustrating an example of an antenna switching in a 2T4R WTRU. For example, a first Tx chain 41 may be (e.g., sequentially) switchable to (e.g., between) two different antennas 401, 402 of a first set of antennas; a second Tx chain 42 may be (e.g., sequentially) switchable to (e.g., between) two different antennas 403, 404 of a second set of antennas to support transmission of an SRS from all antennas that may be used for reception.

In NR Release 17, SRS antenna switching up to eight Rx antennas may be supported. NR Release 17 supported configurations may include any of 1T6R, 1T8R, 2T6R, 2T8R, 4T6R, and 4T8R. For example, a selection criterion for SRS switching configurations may include any of a CSI latency and a performance e.g., considering any of insertion loss, use cases, antenna structure, WTRU power saving, SRS resource configuration, etc.

For example, a WTRU may comprise one or more Tx chains that may be switchable to one or more antenna ports. For example, an xTyR antenna configuration may comprise (e.g., be associated with) one or more Tx chains coupled (e.g., associated, switched) to one or more antenna ports.

WTRU Coherence Capability Example

According to embodiments, a Tx chain may have an amplitude and a phase response. For example, the Tx chain may be viewed as a filter that may have an amplitude and a phase response. Throughout embodiments described herein (e.g., at least) two coherent Tx chains may be seen as (e.g., at least) two Tx chains exhibiting a (e.g., very) close amplitude and phase response. In other words, for a same test signal input to the Tx chains, the output of coherent Tx chains may exhibit (e.g., output test signals with) a negligible deviation in amplitude and phase, and the output of non-coherent Tx chains may exhibit (e.g., output test signals with) a non-negligible deviation in amplitude and phase.

In NR Release 15, three different transmission capabilities were introduced to improve uplink transmission reliability. The WTRU transmission capabilities may reflect the integrity of the uplink Tx chains in terms of any of phase and time coherency that may result from impairments. The WTRU transmission capabilities may include any of nonCoherent (NC), partialAndNonCoherent (PNC) and fullAndPartialAndNonCoherent (FPNC).

In a FPNC WTRU, all Tx chains may be coherent, e.g., for a same test signal, input to the Tx chains, all Tx chains may exhibit a negligible deviation in amplitude and phase.

In a NC WTRU, for a same test signal input to Tx chains, outputs of any of Tx chains may exhibit a non-negligible deviation in amplitude and phase.

In a PNC WTRU, subsets of Tx chains may be considered to have coherent Tx chains. A PNC WTRU may comprise non-coherent Tx chains. For example, a PNC WTRU may comprise different subsets of coherent Tx chains, wherein Tx chains of different subsets may be non-coherent.

Reporting WTRU transmission capabilities may allow to adapt the precoding operation based on the coherence level of WTRU transmit architecture. For example, based on (e.g., potential) phase/amplitude imbalances between different Tx chains corresponding to an indicated WTRU coherence capability, (e.g., only) a specific subset of precoders may be allowed (e.g., selected) for transmission.

According to embodiments, SRS may be used to estimate a downlink CSI through uplink (e.g., transmission) measurements. WTRU coherence capability may impact integrity of uplink transmissions. Embodiments described herein may allow to perform SRS antenna switching for downlink CSI estimation based on WTRU coherence capability.

Without loss of generality, embodiments are described herein with a 4T8R WTRU. Embodiments described herein are equally applicable to any other (e.g., xTyR) WTRU configuration of any other Tx/Rx dimensions (e.g., with any number of Tx and Rx chains). Throughout embodiments described herein, the terms "coherent transmission group", "coherent (e.g., group of) transmit chains", "coherent group", "SRS coherent antenna port group" and "coherent SRS antenna port group" may be used interchangeably to designate a set of coherent Tx chains.

Figure 5:
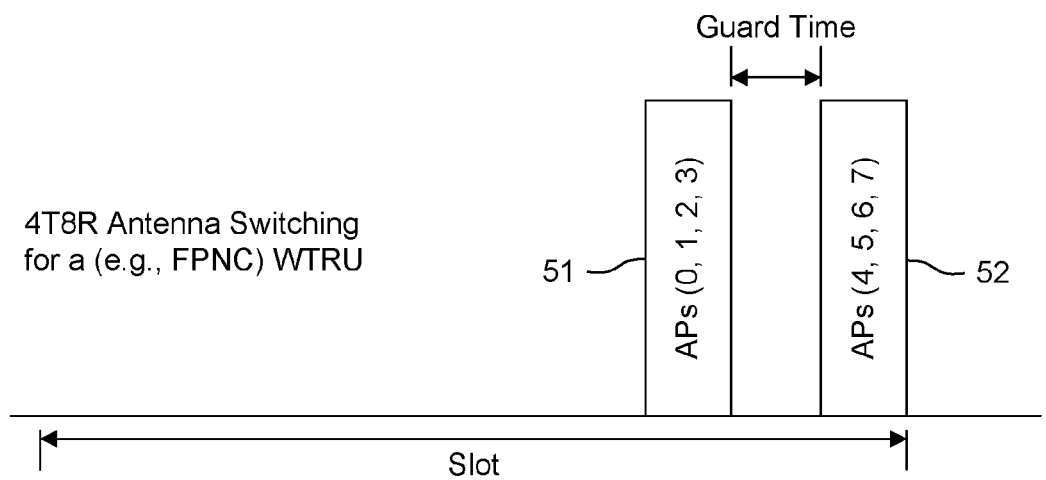
FIG. 5 is a diagram illustrating an example of an SRS antenna ports mapping for a 4T8R WTRU.

FIG. 5 is a diagram illustrating an example of an SRS antenna port mapping for a 4T8R (e.g., FPNC) WTRU. For example, the WTRU may be configured with an SRS resource set comprising e.g., four SRS resources. For example, at a (e.g., each) transmission (e.g., event) four SRS resources may be transmitted using the (e.g., available) four Tx chains. For example, in the first transmission (e.g., event) 51, the four Tx chains may be connected to a first set of antenna ports, e.g., (0, 1, 2, 3), and in the second transmission (e.g., event) 52, they may be connected to a second set of antenna ports e.g., (4, 5, 6, 7).

Example of Modes of Operation

In an embodiment, a WTRU with e.g., a xTyR antenna configuration may (e.g., be configured to) perform SRS antenna switching in any of a first operation mode and a second mode according to an (e.g., indicated) WTRU coherence capability. In the first operation mode (which may be referred to herein as Mode 1), the WTRU may perform SRS antenna switching according to the Tx and Rx dimensions (e.g., number of Tx and Rx chains e.g., x and y). In the second operation mode (which may be referred to herein as Mode 2), the WTRU, may perform SRS antenna switching according to the (e.g., indicated) WTRU coherence capability and the Rx dimension (e.g., the number of antennas). For example, SRS antenna switching may be performed according to the number of coherent Tx chains (which may be referred to herein as x_coh) and the number of Rx chains.

According to embodiments, a WTRU, for example, with a xTyR antenna configuration may report (e.g., transmit an indication reporting) any of a NC and a PNC coherent capability. For example, the WTRU may indicate (e.g., transmit an information indicating) the number of coherent Tx chains (x_coh), the number of coherent Tx chain may be smaller than the number of Tx chains (x). For example, a WTRU may indicate (e.g., transmit an information indicating) the number of (e.g., coherent) groups containing, for example, a number of (x_coh) coherent Tx chains.

According to embodiments, a WTRU may perform SRS antenna switching according to its (e.g., indicated) coherence capability.

For example, in a case where the WTRU reports (e.g., transmits information indicating) its coherence capability as FPNC, The WTRU may perform SRS antenna switching according to the Mode 1, where e.g., the WTRU may perform SRS antenna switching according to the WTRU Tx/Rx dimensions, e.g., the number of Tx and Rx chains (x and y).

For example, in a case where the WTRU reports (e.g., transmits information indicating) its coherence capability as any of NC and PNC, The WTRU may perform antenna switching according to any of Mode 1 and Mode 2 where dimension pairs (x, y) and (x_coh, y) may be respectively considered for SRS antenna switching. In other words, in a case where the WTRU operates in Mode 2, the WTRU may perform SRS antenna switching based on the number of coherent Tx chains (x_coh) and the number of Rx chains (y). In a case where the WTRU operates in Mode 1, the WTRU may perform SRS antenna switching based on the number of (e.g., all) Tx chains (x) and the number of Rx chains (y).

For example, in a case where the WTRU reports (e.g., transmits information indicating) its coherence capability as any of NC and PNC, The WTRU may indicate (e.g., transmit an indication of) the number of coherent Tx chains (x_coh) that the WTRU may support. For example, the indication of the number of coherent Tx chains (x_coh) may be transmitted in any of a same information element (e.g., message) as the WTRU coherence capability, and in a separate information element (e.g., message). For example, the WTRU may receive any of a dynamic and a semi-static value (e.g., as the default configuration) for the number of coherent Tx chains (x_coh), e.g., through any of Layer 1, Layer 2 and radio resource control (RRC) signaling. A WTRU that may have received a number of coherent Tx chains (x_coh) may not report its number of coherent Tx chains (x_coh). In a case where the WTRU receives (e.g., default) configuration (e.g., including x_coh) after having indicated its number of coherent Tx chains (x_coh), the received default configuration may override the WTRU-indicated x_coh value.

For example, in a case where the WTRU reports (e.g., transmits information indicating) its coherence capability as any of NC and PNC, e.g., without indicating the number of coherent Tx chains (x_coh), the number of coherent Tx chains (x_coh) may be considered (e.g., by the gNB) equal to a default value. For example, the default value may be fixed. In another example, the default value may be preconfigured. For example, the default value may be any of two and the number of Tx chains (x).

For example, a WTRU may select between Mode 1 and Mode 2 based on any of an operational configuration and transmission characteristics. For example, any of a PNC and NC WTRU with high mobility, may select Mode 1 as potential distortion in downlink CSI may not be significant due to other impairments, e.g., high Doppler, dated CSI, etc.

Hybrid Example Between Mode 1 and Mode 2

According to embodiments, Mode 1 may enable the WTRU to transmit over (e.g., all) Tx chains (e.g., at a same time) as illustrated in FIG. 5. Operating in Mode 1 may take less time to send all SRS ports to provide the channel estimates compared to Mode 2 where (e.g., only) coherent Tx chains may be used to send SRS at a same time. Mode 2, by considering the coherence capability between Tx chains, may improve the accuracy of the channel representation. Mode 2 may involve more slots to complete the transmission over all transmit dimensions (e.g., compared to Mode 1) since the coherent Tx chains may be (e.g., only) a subset of all the Tx chains.

According to embodiments, a WTRU may (e.g., determine to) perform SRS antenna switching in a hybrid pattern comprising operating with Mode 1 and Mode 2.

Figure 6:
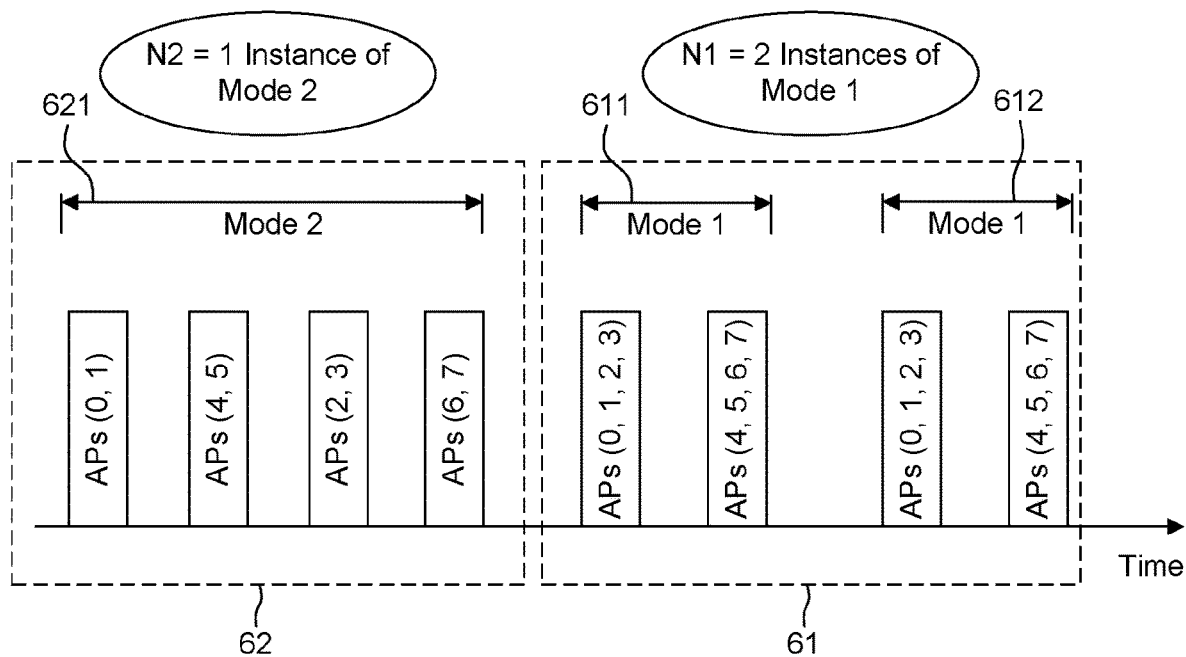
FIG. 6 is a diagram illustrating an example of hybrid mode of operation for a WTRU with Mode 1 and Mode 2.

FIG. 6 is a diagram illustrating an example of hybrid mode of operation for a WTRU with Mode 1 and Mode 2. For example, the WTRU may alternate between switching (e.g., antennas) in Mode 1 and switching (e.g., antennas) in Mode 2. FIG. 6 illustrates a pattern comprising operating in Mode 2 for N2=1 instance (e.g., of occasions), followed by operating in Mode 1 for N1=2 instances (e.g., of occasions). For example, the pattern may repeat by starting over with Mode 2 again. During a Mode 2 instance (e.g., of occasions) 621, the WTRU may perform SRS switching according to two coherent Tx chains (e.g., initially connected to APs 0 and 1). Four successive transmissions may be performed by the WTRU to complete transmission of the eighth APs. During a Mode 1 instance (e.g., of occasions) 611, 612, the WTRU may perform SRS antenna switching according to the total transmit dimensions. The WTRU may transmit (e.g., at a same time), for example, APs 0, 1, 2, and 3 where the pair Tx chains connected to (0, 1) may be pairwise coherent, the pair Tx chains connected to (2, 3) may be pairwise coherent, but the Tx chains between pairs may not be coherent.

According to embodiments, a switching pattern (e.g., as illustrated in FIG. 5) may represent any combination of any of Mode 1 and Mode 2 operations over any number of instances (e.g., of occasions).

According to embodiments, the WTRU may obtain (e.g., determine) the switching pattern based on any of a timer and a counter. For example, the switching pattern may be obtained based on a time period where the WTRU may perform antenna switching by alternating between operating in Mode 1 during a first time interval (e.g., T1 seconds) and operating in Mode 2 during a second time interval (e.g., T2 seconds). Time interval values (T1, T2) may be any of semi-statically configured and preconfigured. In another example, the pattern may be obtained according to a first number N1 of occasions for operating in Mode 1 and a second number N2 of occasions for operating in Mode 2 e.g., during a time period as illustrated in FIG. 6. The first and the second number of occasions (N1, N2) may be any of semi-statically configured and preconfigured.

According to embodiments, an activity pattern may represent any part of a switching pattern that may be used by the WTRU.

According to embodiments, the WTRU may obtain (e.g., determine) an activity pattern which may be associated with the switching pattern. For example, the switching pattern may be statically configured as illustrated in FIG. 6. For example, the WTRU may obtain (e.g., determine) the activity pattern based on the dashed boxes 61, 62 which may indicate parts of the switching pattern that the WTRU may use to transmit SRS. For example, the WTRU may obtain (e.g., determine) from the activity pattern which of the Modes to use. For example, the WTRU may determine to (e.g., only) be active for Mode 1 parts of the pattern (e.g. grey box) 61. For example, during the Mode 2 parts 62 of the pattern, the WTRU may be silent.

According to embodiments, the activity pattern may change (e.g., be obtained) based on any of a semi-static configuration and a dynamic indication (e.g., received by any of L1, L2 and RRC signaling). For example, the activity pattern may switch (e.g., vary) depending on any of the SRS configuration, traffic priority (e.g., Mode 1 for URLLC, Mode 2 for eMBB), RRC state of the WTRU, WTRU velocity, etc. For example, an activity pattern may be defined across Modes. For example, the activity pattern may include instances of Mode 1 and instances of Mode 2.

According to embodiments, the WTRU may adjust any of the panel on/off patterns, beam switching times, and may transmit the SRS according to the (e.g., alternating) patterns between Mode 1 and Mode 2.

According to embodiments, at the receiver, the total radiating power (TRP) may determine the switching pattern that may have been used by the WTRU at a (e.g., given) time using e.g., the configured pattern. The TRP may switch its Rx filter depending on which mode of operation may be used by the WTRU.

For example, the TRP may provide a weighting factor to determine the overall channel estimate. For example, channel estimates provided with Mode 2 (which may be referred to herein as $H_2$) using coherent Tx chains pair groups may be given a different weight compared to channel estimates provided by Mode 1 (which may be referred to herein as $H_1$). For example, in a case where the samples are time averaged, the samples may be averaged as $H_{ave}=\alpha H_1+(1-\alpha)H_2$ where $H_{ave}$ may be the time averaged channel, and a may be the weighting factor between the channels obtained in Mode 1 and Mode 2.

In another example, the TRP may obtain separate channels $H_1$ and $H_2$, and a (e.g., each) channel may be used, for example, in different applications. For example, for high channel accuracy applications, the TRP may determine to use $H_2$, and for low latency applications the TRP may use $H_1$ estimates.

Example of Antenna Switching in Mode 2

According to embodiments, A WTRU may be considered as (e.g., correspond to) a set of coherent transmission groups where the dimension of Tx for SRS transmission may be the number of coherent Tx chains (x_coh). For example, a 4Tx PNC WTRU may be considered as (e.g., correspond to) a set of two coherent transmission groups. In another example, a 4Tx NC UE may be considered (e.g., correspond to) as a set of four coherent transmission groups (e.g., with a single Tx chain in a (e.g., each) group). In yet another example, a 4Tx FPNC WTRU (due to its full coherent capability), may be considered as (e.g., correspond to) any arbitrary set of coherent transmission groups of any number of Tx chains, e.g., any of two groups of two coherent Tx chains (2+2), two groups of respectively one Tx chain and three coherent Tx chains (1+3), etc.

Using One of the Coherent Transmission Group Example

According to embodiments, any of a PNC and a NC WTRU may use (e.g., only) one of its coherent transmission groups for transmission at a (e.g., given time), for example, to avoid distortion in SRS transmission.

Figure 7:
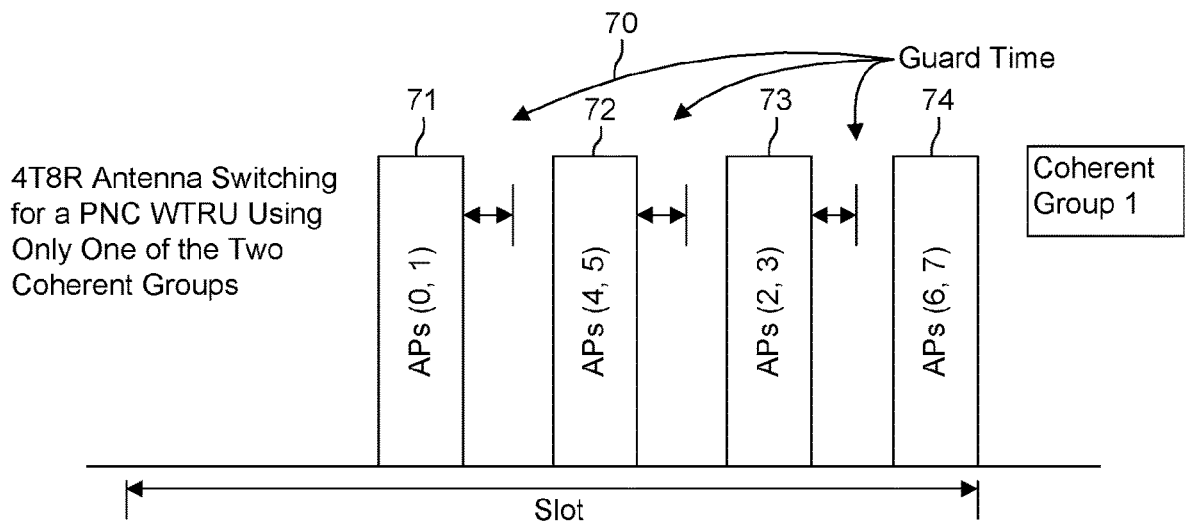
FIG. 7 is a diagram illustrating an example of SRS transmission using one of the coherent transmission groups, for a 4T8R PNC WTRU.

FIG. 7 is a diagram illustrating an example of SRS transmission using one of the coherent transmission groups, for a 4T8R PNC WTRU. According to embodiments, a same pair of coherent Tx chains may be switched e.g., sequentially to different pairs of antennas. For example, the WTRU may select one of the (e.g., available) coherent transmission groups, where the dimension of SRS transmission may be, for example x_coh=2. In the illustrated example, the selected coherent transmission group may be one of the pairs of coherent Tx chains. Using the selected coherent transmission group, The WTRU may transmit SRS using e.g., two of the SRS resources of the configured SRS resource set in a (e.g., each) transmission (e.g., event) 71, 72, 73, 74. In the illustrated example, for a (e.g., each) transmission (e.g., event) 71, 72, 73, 74 a different pair of antenna ports may be used (e.g., connected to the pair of coherent Tx chains, e.g., (0, 1), (4, 5), (2, 3), (6, 7). According to embodiments, the WTRU may separate the SRS transmissions (e.g., events) by applying a guard time 70, e.g., for allowing antenna switching.

Using of any Number of Coherent Transmission Groups Example

According to embodiments, any of a PNC and a NC WTRU may use any number (e.g., more than one) of its coherence groups for SRS transmission According to embodiments, (e.g., only) one of the coherent transmission groups may be used at a time.

Figure 8:
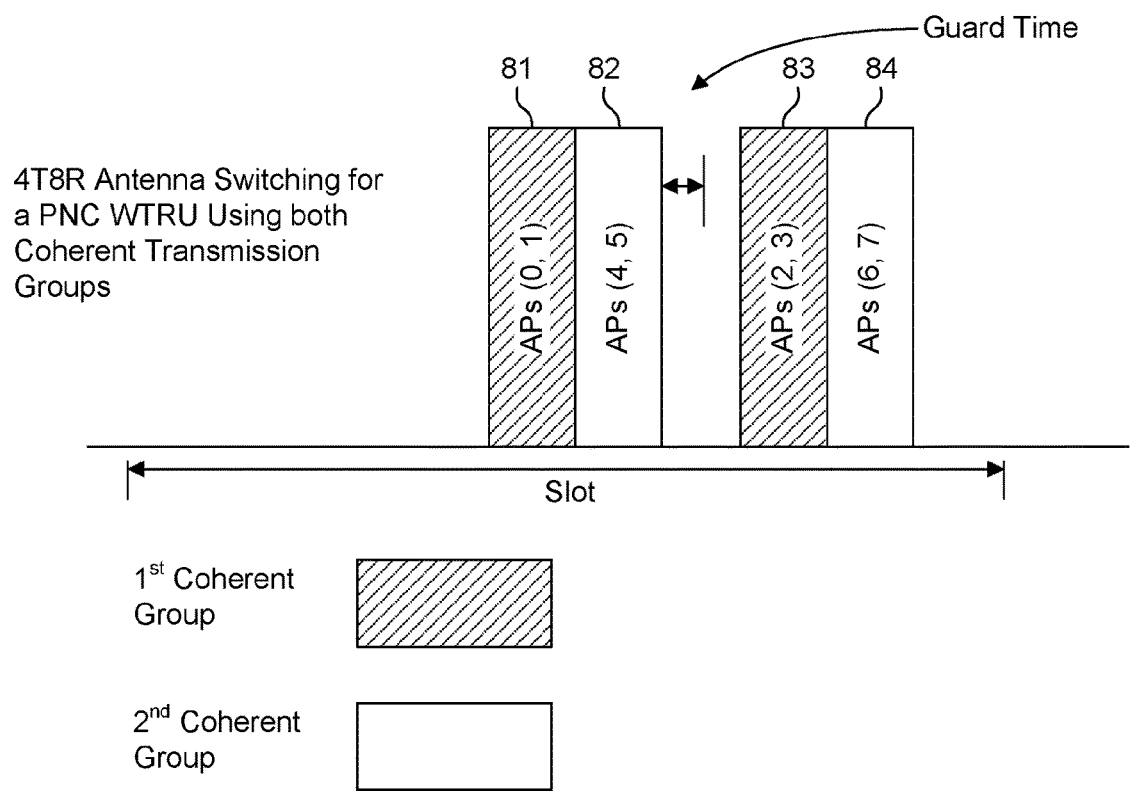
FIG. 8 is a diagram illustrating an example of antenna switching for SRS transmission for a 4T8R PNC WTRU where both coherent transmission groups may be used.

FIG. 8 is a diagram illustrating an example of antenna switching for SRS transmission for a 4T8R PNC WTRU where both coherent transmission groups may be used. For example, a different pair of coherent Tx chains may be used for different (e.g., every) SRS transmission. For example, the WTRU may use a first pair of coherent Tx chains of a first coherent transmission group for a first SRS transmission (e.g., event) 81 and a second pair of coherent Tx chains of a second coherent transmission group for a second SRS transmission 82 (e.g., event). For example, the WTRU may use a third pair of coherent Tx chains of the first coherent transmission group for a third SRS transmission (e.g., event)

83 and a fourth pair of coherent Tx chains of the second coherent transmission group for a fourth SRS transmission (e.g., event) 84.

Since (e.g., both) pairs of coherent Tx chains may be used (e.g., for successive SRS transmissions) the first and second SRS transmissions (e.g., events) 81, 82, may be sequential e.g., without being separated by a guard time. Similarly, the third and the fourth SRS transmissions (e.g., events) 83, 84 may be sequential e.g., without being separated by a guard time. According to embodiments, (e.g., only) one instance of antenna switching may be used where, for example, the 4Tx chains may be switched from the first set of four antennas to the second set. According to embodiments, a guard time may be used for separating (e.g., only) the second 82 and the third 83 SRS transmissions (e.g., events), e.g., for antenna switching.

For example, the WTRU may select a first and a second coherent transmission groups, where the dimension of SRS transmission may be e.g., x_coh=2.

For example, using the first selected coherent transmission group, the WTRU may transmit SRS using e.g., two of the SRS resources of the configured SRS resource set for the first 81 and third 83 SRS transmissions (e.g., events).

For example, using the second selected coherent transmission group, the WTRU may transmit SRS using e.g., two of the SRS resources of the configured SRS resource set for the second 82 and fourth 82 SRS transmissions (e.g., events).

For example, the WTRU may separate the second 82 and the third 83 SRS transmissions (e.g., events) by applying a guard time, e.g., to allow antenna switching.

Figure 9:
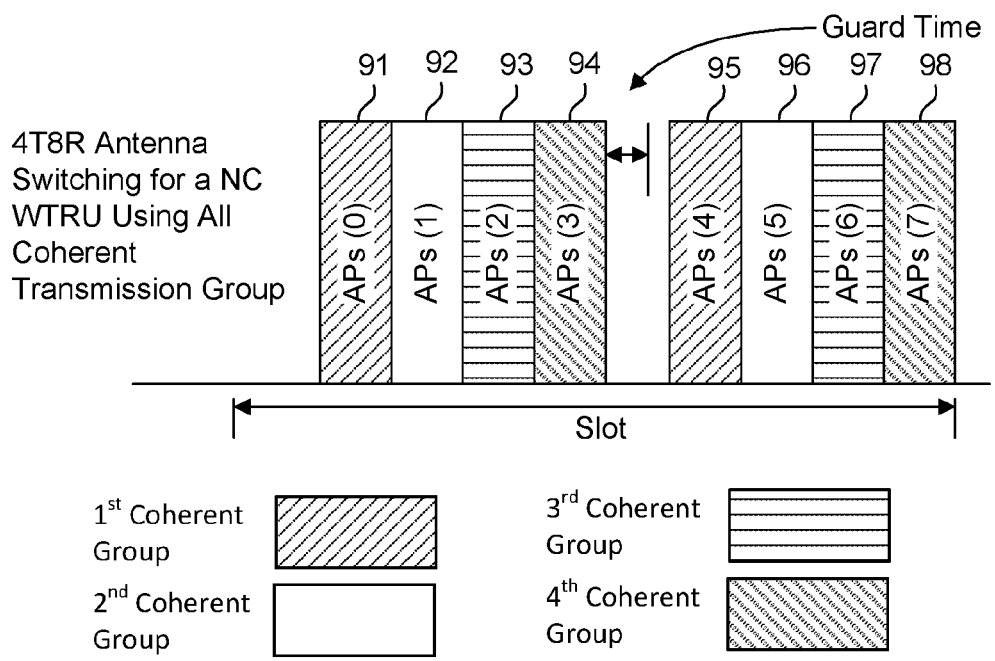
FIG. 9 is a diagram illustrating an example of antenna switching for SRS transmission for a 4T8R NC WTRU where four coherent transmission groups may be used.

FIG. 9 is a diagram illustrating an example of antenna switching for SRS transmission for a 4T8R NC WTRU where four coherent transmission groups may be used. According to embodiments, the WTRU may be a NC WTRU. In a NC WTRU, (e.g., only) a single Tx chain may be considered as a coherent transmission group for use during an SRS transmission (e.g., event). In the illustrated example, for a (e.g., each) transmission, a single Tx chain may be is used. For example, the WTRU may perform a first 91, a second 92, a third 93 and a fourth 94 SRS transmissions sequentially e.g., without any guard time between the SRS transmissions. For example, the WTRU may perform a fifth 95, a sixth 96, a seventh 97 and an eighth 98 SRS transmissions sequentially e.g., without any guard time between the SRS transmissions. In the illustrated example, (e.g., only) one instance of antenna switching may be used where, for example, the (e.g., entire) four Tx chains may be switched from the first set of four antennas to the second set. According to embodiments, a guard time may be used for separating (e.g., only) the fourth 94 and the fifth 95 SRS transmissions, e.g., for antenna switching.

For example, the WTRU may select a first, a second, a third and a fourth coherent transmission groups, where the dimension of SRS transmission may be e.g., x_coh=1

For example, using the first selected coherent transmission group, the WTRU may transmit SRS using e.g., one of the SRS resources of the configured SRS resource set for the first 91 and fifth 95 SRS transmissions (e.g., events).

For example, using the second selected coherent transmission group, the WTRU may transmit SRS using e.g., one of the SRS resources of the configured SRS resource set for the second 92 and sixth 96 SRS transmissions (e.g., events).

For example, using the third selected coherent transmission group, the WTRU may transmit SRS using e.g., one of the SRS resources of the configured SRS resource set for the third 93 and seventh 97 SRS transmissions (e.g., events).

For example, using the fourth selected coherent transmission group, the WTRU may transmit SRS using e.g., one of the SRS resources of the configured SRS resource set for the fourth 94 and eighth 98 SRS transmissions (e.g., events).

For example, the WTRU may separate the fourth 94 and fifth 95 SRS transmissions (e.g., events) by applying a guard time, e.g., to allow antenna switching.

Figure 10:
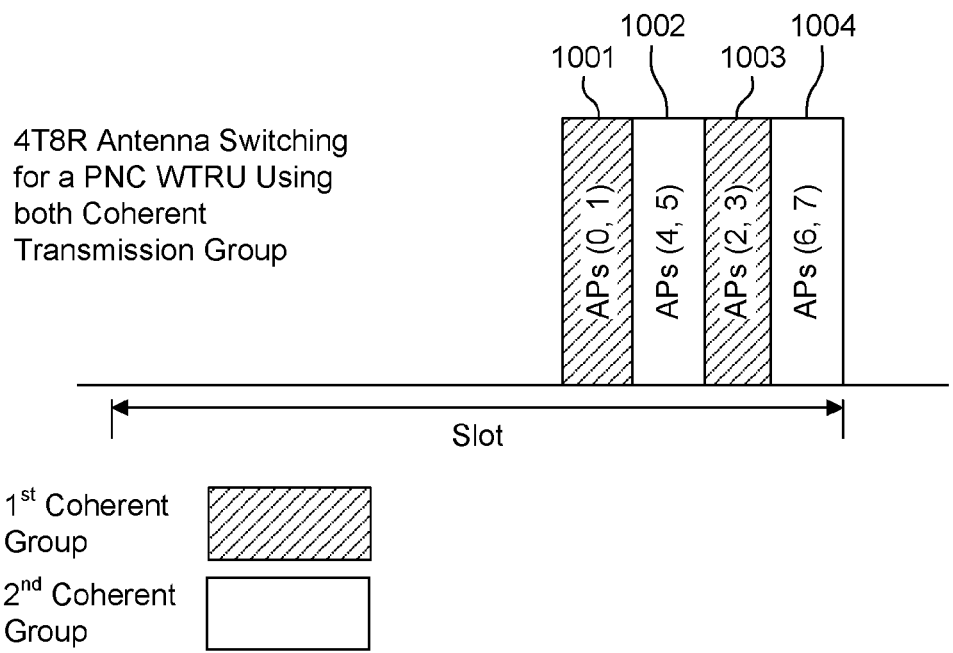
FIG. 10 is a diagram illustrating an example of antenna switching for SRS transmission for a 4T8R PNC WTRU where both coherent transmission groups may be used.

FIG. 10 is a diagram illustrating an example of antenna switching for SRS transmission for a 4T8R PNC WTRU where both coherent transmission groups may be used. According to embodiments, the WTRU may use a different pair of coherent Tx chains for a (e.g., every) SRS transmission (e.g., event). For example, the WTRU may perform a first 1001, a second 1002, a third 1003 and a fourth 1004 SRS transmissions sequentially e.g., without any guard time between the SRS transmissions. Considering both pairs of coherent Tx chains may be used, the first 1001 and second 1002 SRS transmissions may be performed e.g., without any guard time separating the first 1001 and second 1002 SRS transmissions. Similarly, the third 1003 and the fourth 1004 SRS transmissions may be performed sequentially, e.g., without any guard time separating the third 1003 and the fourth 1004 SRS transmissions. In the example illustrated in FIG. 10, two instances of antenna switching may be used. For example, a (e.g., each) instance may switch the two Tx chains of a coherent transmission group, e.g., from a first set of two antennas to a second set. For example, while the second SRS transmission using the second coherent transmission group may be in progress, the WTRU may switch the antennas for the first coherent transmission group. As such, no guard time may be inserted between the second 1002 and the third 1003 SRS transmissions (e.g., events).

For example, the WTRU may select a first and a second coherent transmission groups, where the dimension of SRS transmission may be e.g., x_coh=2.

For example, using the first selected coherent transmission group, the WTRU may transmit SRS using e.g., two of the SRS resources of the configured SRS resource set for the first 1001 and the third 1003 SRS transmissions (e.g., events).

For example, using the second selected coherent transmission group, the WTRU may transmit SRS using e.g., two of the SRS resources of the configured SRS resource set for the second 1002 and the fourth SRS transmissions (e.g., events).

For example, the WTRU may switch the antennas for the first coherent transmission group, while the second SRS transmission using the second coherent transmission group may be in progress.

Example of SRS Antenna Switching Using a Subset of Tx Chains

According to embodiments, a WTRU may not use the (e.g., entire set of) available Tx chains for SRS transmission at a time, and the WTRU may use (e.g., only) a subset of the available Tx chains for SRS transmission at a time.

According to embodiments, the WTRU may perform antenna switching for one subset of Tx chains while the WTRU may have (e.g., perform) an ongoing transmission in another subset of Tx chains.

Embodiments described herein may allow to leverage the coherence capability of the WTRUs to improve, for example, downlink CSI estimation.

Embodiments described herein may also allow to simplify antenna switch circuits in a WTRU by, for example, avoiding use of (e.g., customized) switches, e.g., 3-to-1. Embodiments described herein may also allow to avoid use of cascaded switches, e.g., two cascade switches of 2-to-1, that may introduce insertion loss in the Tx chain.

Embodiments described herein may be applicable to FPNC WTRUs, for example, in a case where the WTRU coherence capability may not be considered for antenna switching. In other words, the switching mechanism described in FIG. 7-FIG. 10 may be applicable in a case where the WTRU is a FPNC WTRU, or in a case where the WTRU coherency is not considered for determination of SRS switching mechanism. FIG. 11-FIG. 14 illustrate antenna switching mechanism based on embodiments described herein for a 4T6R WTRU.

Figure 11:
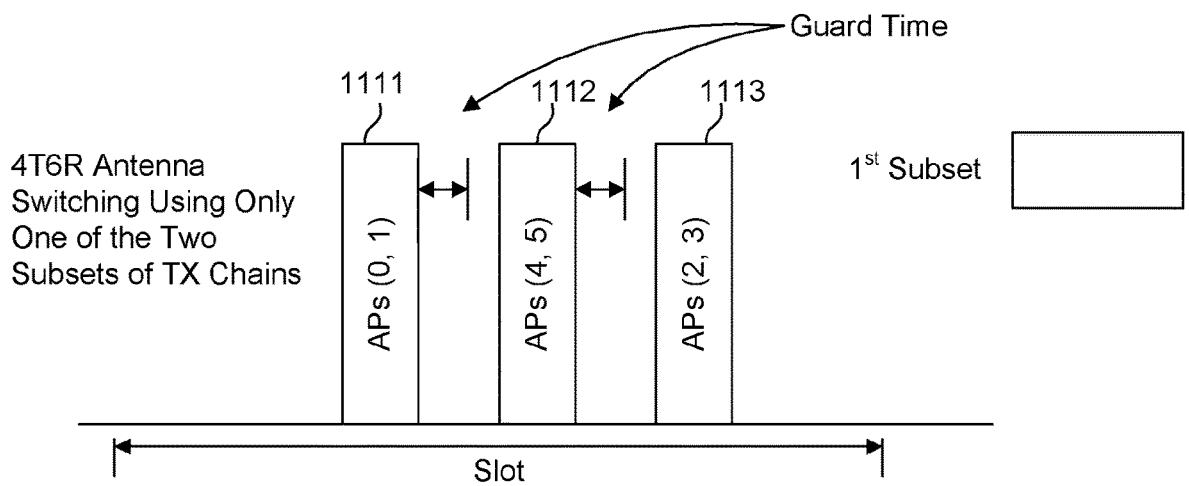
FIG. 11 is a diagram illustrating an example of SRS antenna ports mapping for a 4T6R WTRU using one of the subsets of Tx chains.

FIG. 11 is a diagram illustrating an example of SRS antenna ports mapping for a 4T6R WTRU using one of the subsets of Tx chains. In the illustrated example, the selected subset of Tx chains may be one of the pairs of Tx chains. Using the selected subset of Tx chains, The WTRU may transmit SRS using e.g., two of the SRS resources of the configured SRS resource set in a (e.g., each) transmission (e.g., event) 1111, 1112, 1113. In the illustrated example, for a (e.g., each) transmission (e.g. event) 1111, 1112, 1113 a different pair of antenna ports may be used (e.g., connected to the pair of coherent Tx chains, e.g., (0, 1), (4, 5), (2, 3). According to embodiments, the WTRU may separate the SRS transmissions (e.g., events) by applying a guard time, e.g., for allowing antenna switching.

Figure 12:
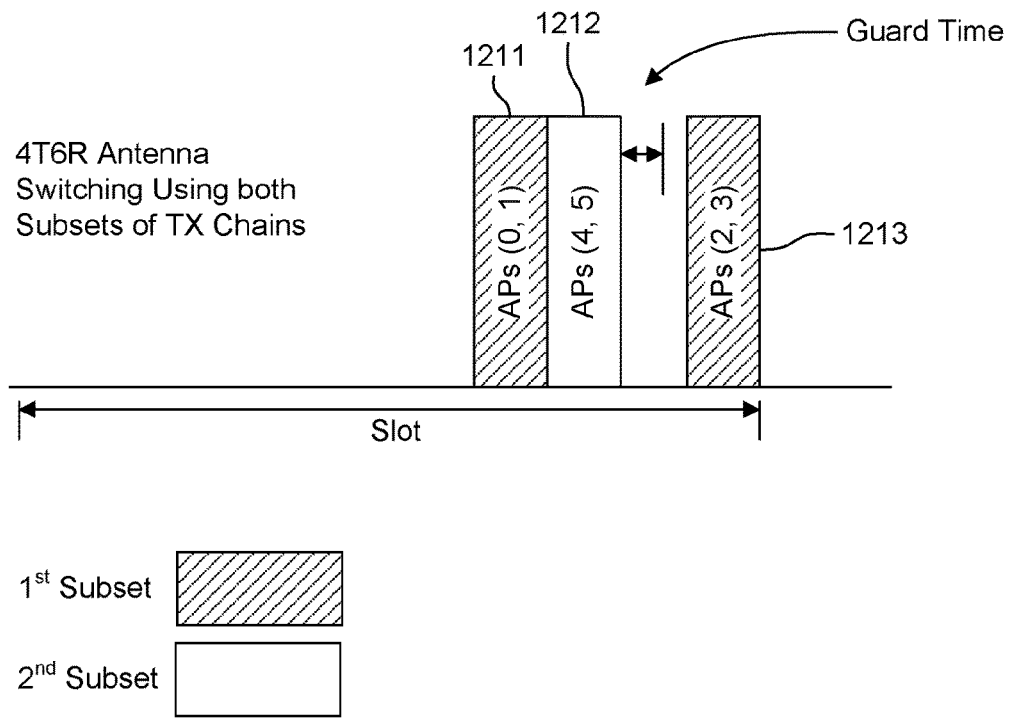
FIG. 12 is a diagram illustrating an example of SRS antenna ports mapping for a 4T6R WTRU using both subsets of Tx chains.

FIG. 12 is a diagram illustrating an example of SRS antenna ports mapping for a 4T6R WTRU using both subsets of Tx chains. For example, a different subsets of Tx chains may be used for different SRS transmission. For example, the WTRU may use a first pair of Tx chains of a first subset for a first SRS transmission (e.g., event) 1211 and a second pair of Tx chains of a second subset for a second SRS transmission 1212 (e.g., event). For example, the WTRU may use a third pair of Tx chains of the first subset for a third SRS transmission (e.g., event) 1213. According to embodiments, a guard time may be used for separating (e.g., only) the second 1212 and the third 1213 SRS transmissions (e.g., events), e.g., for antenna switching.

Figure 13:
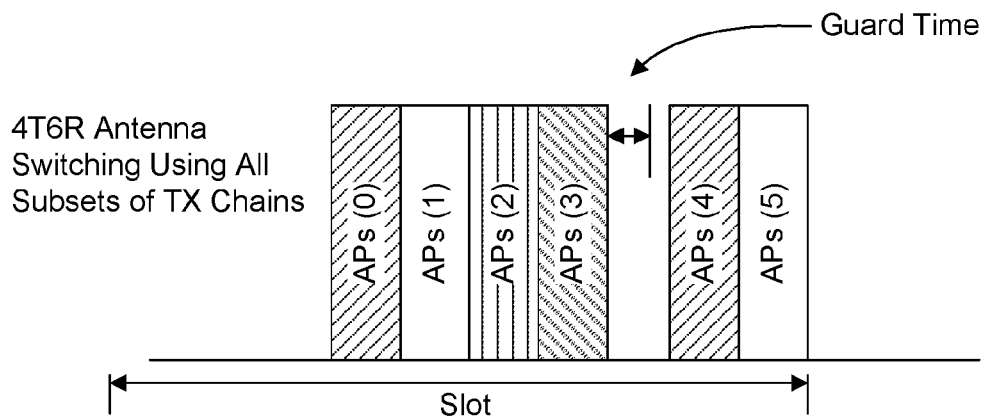
FIG. 13 is a diagram illustrating an example of SRS antenna ports mapping for a 4T6R WTRU using all subsets of Tx chains.
Figure 13:
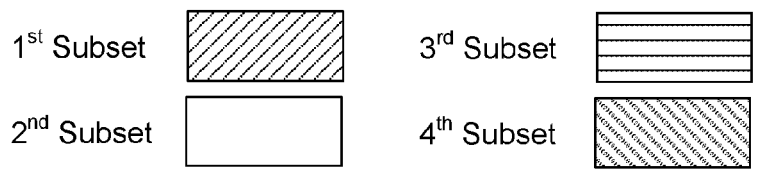

FIG. 13 is a diagram illustrating an example of SRS antenna ports mapping for a 4T6R WTRU using (e.g., all, different) subsets of Tx chains. In the illustrated example, there may be four subsets of Tx chains of a (e.g., single Tx chain).

Figure 14:
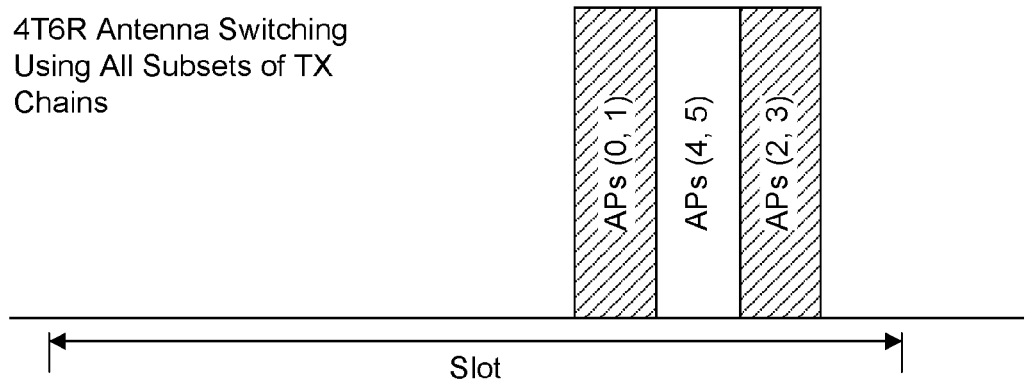
FIG. 14 is a diagram illustrating another example of SRS antenna ports mapping for a 4T6R WTRU using all subsets of Tx chains.
Figure 14:
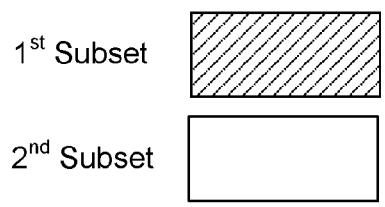

FIG. 14 is a diagram illustrating another example of SRS antenna ports mapping for a 4T6R WTRU using (e.g., all, different) subsets of Tx chains. In the illustrated example, there may be two subsets of Tx chains, where the subsets may comprise a pair a Tx chains.

Example of a Procedure for SRS Antenna Switching for 2T6(8)R, 4T6(8)]

Based on the principles explained in the previous section, different examples of antenna switching in a 2/4T6(8)R WTRU are described herein. The same principles may be applicable to other xTyR WTRU dimensions.

In a 2T6R example, a WTRU may be configured with (e.g., may receive configuration information indicating) more than one SRS resource set, where a (e.g., each) SRS resource set may have (e.g., include) six SRS resources transmitted in different symbols, and a (e.g., each) SRS resource in a given set may include a single SRS port. For example, the SRS port of the first, third and fifth SRS resources may be associated with a first WTRU antenna port, and the SRS port of the second, fourth and sixth SRS resources may be associated with a second WTRU antenna port. For example, a WTRU may transmit the SRS resources sequentially e.g., without (e.g., using) any guard symbol (e.g., time) between transmissions of the SRS resources, e.g., Y=0.

In a 4T6R example, a WTRU may be configured with (e.g., may receive configuration information indicating) more than one SRS resource set, where a (e.g., each) SRS resource set may have (e.g., include) three SRS resources transmitted in different symbols, and a (e.g., each) SRS resource in a given set may include two SRS ports (e.g., a pair of SRS ports). For example, the SRS port pair of the first and the third SRS resources may be associated with a first WTRU antenna port pair, and the SRS port pair of the second SRS resource may be associated with a second WTRU antenna port pair. For example, a WTRU may transmit the SRS resources sequentially e.g., without (e.g., using) any guard symbol (e.g., time) between transmissions of the SRS resources, e.g., Y=0.

In a 2T8R example, a WTRU may be configured with (e.g., may receive configuration information indicating) more than one SRS resource set, where a (e.g., each) SRS resource set may have (e.g., include) eight SRS resources transmitted in different symbols, and a (e.g., each) SRS resource in a given set may include a single SRS port. For example, the SRS port of the first, third, fifth, and seventh SRS resources may be associated with a first WTRU antenna port, and the SRS port pairs of the second, fourth, sixth, and eighth SRS resources may be associated with a second WTRU antenna port. For example, a WTRU may transmit the SRS resources sequentially e.g., without (e.g., using) any guard symbol (e.g., time) between transmissions of the SRS resources, e.g., Y=0.

In a 4T8R example, a WTRU may be configured with (e.g., may receive configuration information indicating) more than one SRS resource set, where a (e.g., each) SRS resource set may have (e.g., include) four SRS resources transmitted in different symbols, and a (e.g., each) SRS resource in a given set may include two SRS ports (e.g., a pair of SRS ports). For example, the SRS port pair of the first and third SRS resources may be associated with a first WTRU antenna port pair, and the SRS port pair of the second and fourth SRS resources may be associated with a second WTRU antenna port pair. For example, a WTRU may transmit the SRS resources sequentially e.g., without (e.g., using) any guard symbol (e.g., time) between transmissions of the SRS resources, e.g., Y=0.

For example, a WTRU may indicate (e.g., transmit capability information indicating) its capability for performing antenna switching for a first subset of Tx chains when it may have (e.g., during) an ongoing transmission on a second subset of Tx chains. For example, if a WTRU declares (e.g., transmits capability information indicating) its capability for the above-described antenna switching mechanism, it may receive (e.g., configuration information indicating) a configuration to perform antenna switching assuming (e.g., with) Y=0, where Y may be the number of guard symbols between transmissions of two SRS resources.

For example, if a WTRU declares (e.g., transmits capability information indicating) its capability for the above-described antenna switching mechanism, it may determine whether it may assume Y=0 (e.g., no guard symbols between transmissions of two SRS resources) from other configuration parameters (e.g., SRS configuration). For example, if the number of symbols per SRS resource is such that the duration of SRS transmissions may extend beyond a predefined time boundary, e.g., a slot, the WTRU may assume the mode of operation as described with Y=0 (e.g., may determine to sequentially transmit SRS resources e.g., without any guard symbol (e.g., time) between transmitted SRS resources) to reduce the duration of the channel sounding.

Figure 16A:
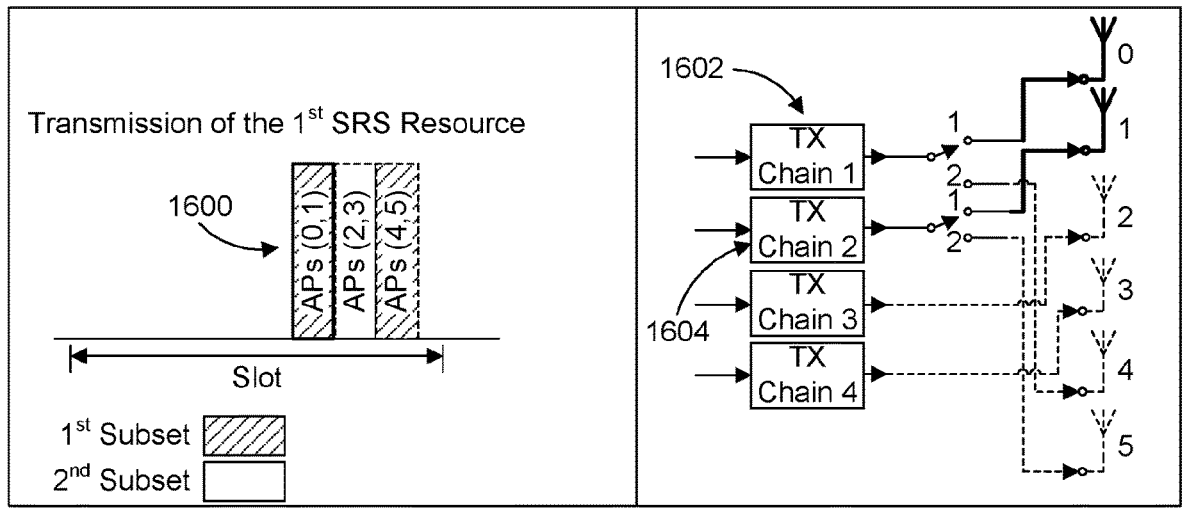
FIG. 16A is a diagram illustrating an example of transmission of a first SRS resource according to SRS antenna switching for a 4T6R WTRU.
Figure 16B:
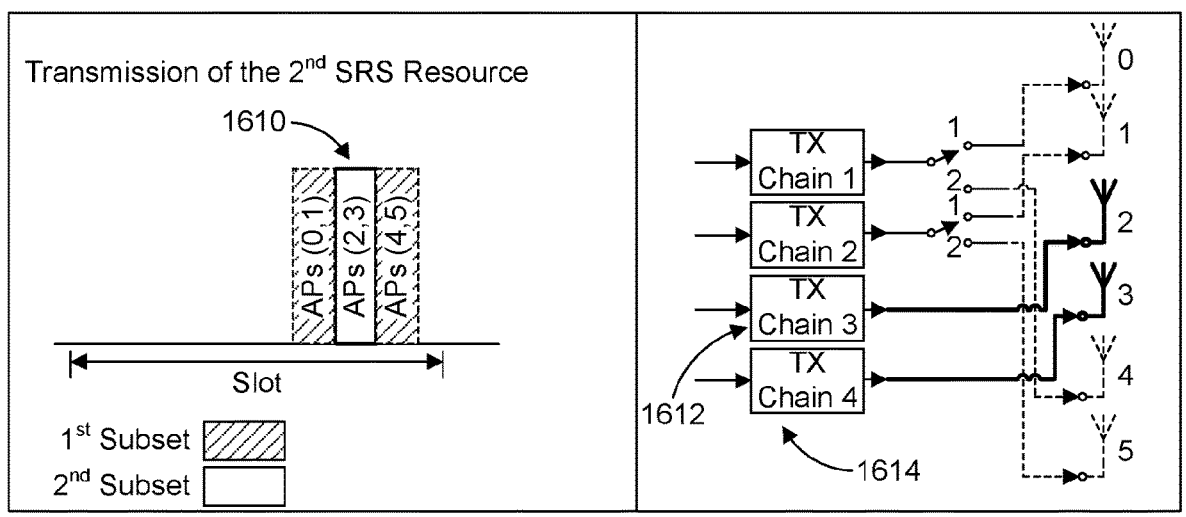
FIG. 16B is a diagram illustrating an example of transmission of a second SRS resource according to SRS antenna switching for a 4T6R WTRU.
Figure 16C:
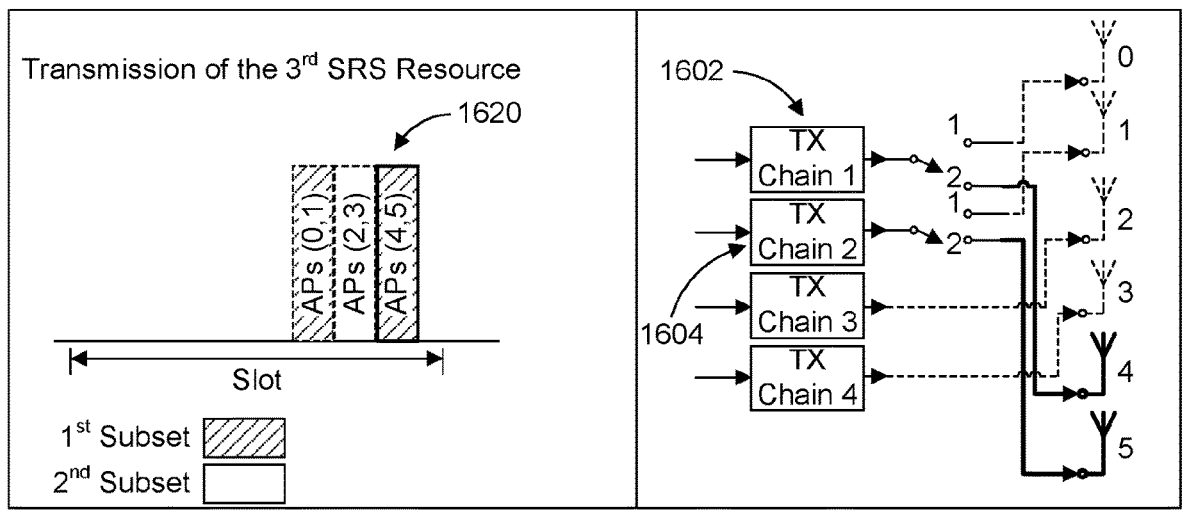
FIG. 16C is a diagram illustrating an example of transmission of a third SRS resource according to SRS antenna switching for a 4T6R WTRU.

FIGS. 16A-16C show an example of the capability described above that may be used for SRS antenna switching in a 4T6R WTRU. As illustrated in FIGS. 16A-16C, an SRS resource set may comprise three SRS resources (e.g., each) supporting (being associated with) two SRS ports. As shown in FIG. 16A, a WTRU may transmit the first SRS resource 1600 using the first pair of Tx chains 1602 and 1604 from a first antenna pair (0,1). For example, as shown in FIG. 16B, the WTRU may (e.g., immediately proceed to) transmit the second SRS resource 1610 using the second pair of Tx chains 1612 and 1614 from a second antenna pair (2,3) (e.g., without any guard time between the first SRS resource transmission and the second SRS resource transmission). While a WTRU may have an ongoing transmission from (e.g., using) its second Tx chain from the second antenna pair (2,3), the WTRU may switch its first pair of Tx chains 1602 and 1604 from the first antenna pair (0,1) to a third antenna pair (4,5). As shown in FIG. 16C, once the transmission of the second SRS resource is complete, a WTRU may (e.g., immediately) begin transmission of the third SRS resource 1620 from the third antenna pair (4,5), (e.g., without waiting for any guard time after completion of the transmission of the second SRS resource).

Example of Gain Compensation for Unbalanced Switching Network

In some xTyR WTRU architectures, the antenna switching mechanism in a WTRU may not be balanced and may result in having different power for transmitted SRS resources. For example, SRS transmission by (e.g., from) some of the antenna ports may incur some additional loss and may be lower by x dB than their set nominal power. Throughout embodiments described herein, the term "x dB" may be used to refer to a loss and may be meant as a variable. The parameter "x" used together with "dB" may not be the same as the parameter "x" used in the description of a xTyR configuration. For example, channel sounding based on SRS resources transmitted from those antenna ports may be at a lower power than other ports, resulting in a potential distortion on the estimated downlink channel by a gNB. While the embodiments presented herein below are discussed using the cases for SRS antenna switching, they may also be applicable to compensate similar cases of power imbalance in other transmission scenarios.

Example of WTRU-Assisted gNB-Based Compensation

In an embodiment, a WTRU may indicate to a gNB (e.g., transmit information indicating) existence of a power imbalance e.g., for compensation of the estimated channel at the gNB. For example, a WTRU may (e.g., transmit information to) indicate the power imbalance by, for example, indicating the SRS resources that may be transmitted with a different power than the nominal power.

For example, a WTRU may (e.g., transmit information to) indicate existence of a power imbalance for SRS antenna switching. The indication (e.g., information) may also include the impacted xTyR configuration. Furthermore, the indication (e.g., information) may be per any of a BWP and a band. As part of its capability information, a WTRU may indicate (e.g., transmit) information related to the power imbalance (e.g., any of impacted xTyR configuration, impacted SRS resources, etc., per any of band, BWP, cell, etc.)

For example, (e.g., alternatively) after a WTRU may have indicated (e.g., transmitted information indicating) existence of a power imbalance, the WTRU may be pinged (e.g., receive a request) to report (e.g., transmit) its SRS power imbalance information (e.g., indicating any of the impacted xTyR configuration, impacted SRS resources, etc., per any of band, BWP, cell, etc.)

For one or more xTyR SRS configurations, the indication of power imbalance may be per SRS resource, indicating the SRS resources that may be impacted by the power imbalance. For example, a (e.g., each) SRS resource set may have a separate indication according to the number of SRS resources in the set.

Figure 17:
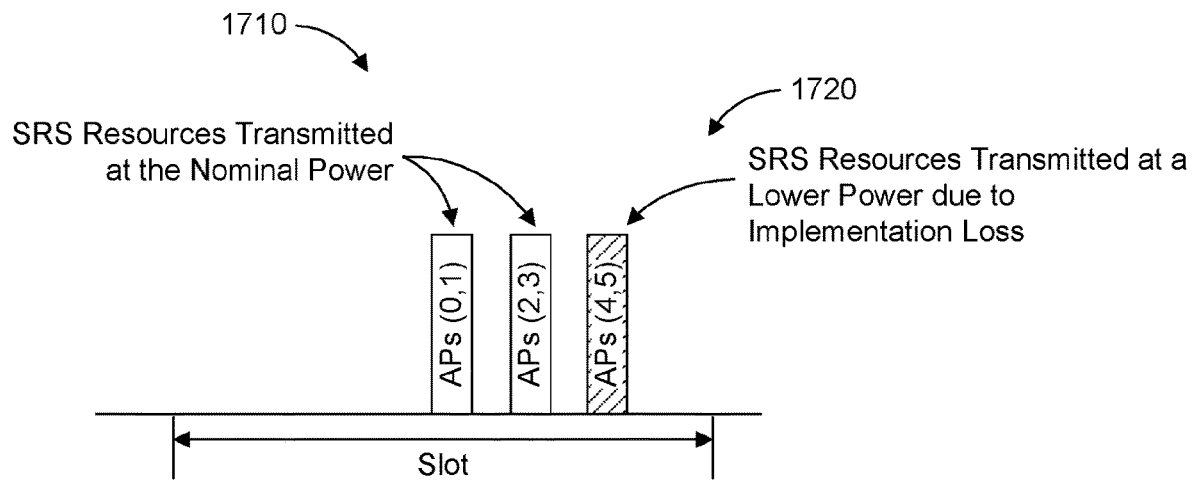
FIG. 17 is a diagram illustrating an example of a power imbalance report indication for a 4T6R WTRU.

FIG. 17 is a diagram illustrating an example of a power imbalance report indication for a 4T6R WTRU. For example, a WTRU may be configured with (e.g., may receive configuration information indicating) L SRS resources 1710 1720, L being an integer number. For example, the WTRU may transmit (e.g., first) SRS using first SRS resources 1710 at nominal power and may transmit (e.g., second) SRS using second SRS resources 1720 at a lower power, e.g., due to implementation loss. For example, a WTRU may indicate (e.g., transmit power imbalance information indicating) the power imbalance per SRS resource by (e.g., a bit field of) L bits, where a 1 may indicate the SRS resources impacted by the power imbalance (e.g., lower power). In FIG. 17 the number of SRS resources is three (L=3). In another example (not illustrated), the indication of the SRS resources impacted by the power imbalance may be performed with log 2(L) bits, where a (e.g., each) state of log 2(L) bits may correspond to a (e.g., different) case.

For one or more xTyR SRS configurations, a WTRU may (e.g., transmit power imbalance information to) indicate, for example, a single value for power imbalance of (e.g., all the, different) impacted SRS resources. In another example, the WTRU may (e.g., transmit power imbalance information to) indicate one value per (e.g., impacted) SRS resource. For example, a WTRU may report (e.g., transmit power imbalance information reporting) the (e.g., exact) power imbalance (such as e.g., any of x dB and a value selected from a set of predefined (e.g., predetermined) values, such as [w x y z] dB).

Figure 18:
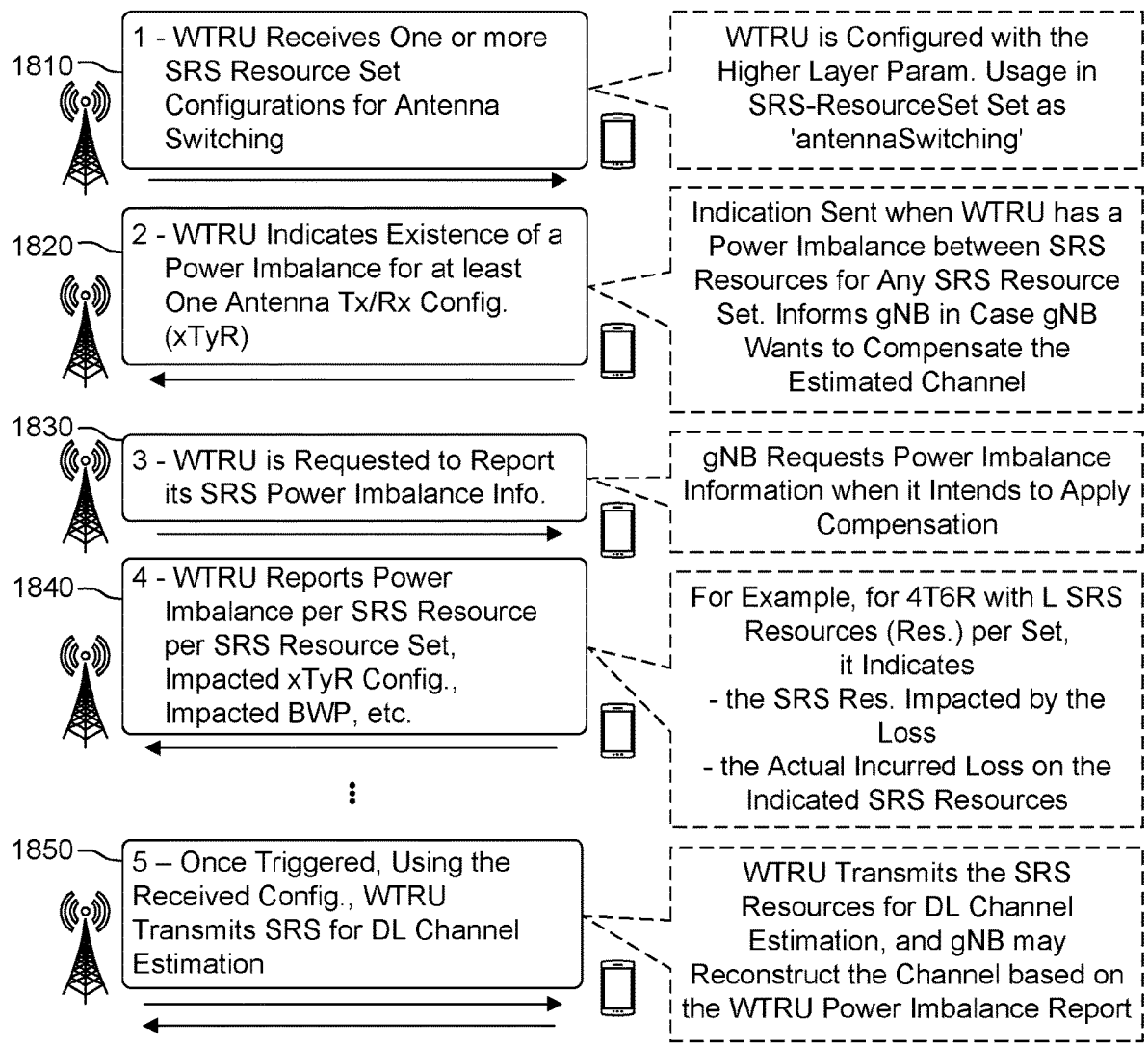
FIG. 18 is a diagram illustrating a first example of a method for WTRU-assisted SRS power imbalance compensation.

FIG. 18 is a diagram illustrating a first example of a method for WTRU-assisted SRS power imbalance compensation. For example, the WTRU may transmit power imbalance information to the gNB for compensation and correct construction of the channel.

For example, e.g., in a step 1810, configuration information may be received by a WTRU from a gNB, where the configuration information may indicate one or more SRS resource sets (e.g., for antenna switching). For example, the configuration information may indicate that a (e.g., each) SRS resource set may be associated with at least one transmit/receive (xTyR) antenna configuration in a set of xTyR antenna configurations.

For example, e.g., in a step 1820, the WTRU may transmit information indicating existence of an SRS power imbalance for at least one xTyR antenna configuration in the set of xTyR antenna configurations.

For example, e.g., in a step 1830, the WTRU may receive a (e.g., message including information indicating a) request to report SRS power imbalance information.

For example, e.g., in a step 1840, the WTRU may transmit (e.g., report) power imbalance information for at least one of the one or more SRS resource sets indicating for the at least one SRS resource set any of: (i) one or more impacted SRS resources in the set (e.g., via a bitmap), (ii) a power imbalance value (for (e.g., each or all) the impacted SRS resources in the set), (iii) an associated xTyR and (iv) an associated BW part (BWP).

Example of WTRU-Based Compensation

In some xTyR WTRU architectures, the antenna switching mechanism in a WTRU may not be balanced and may result in having different power of transmitted SRS resources. For example, SRS resources transmitted by some of the antenna ports may be lower by x dB than their nominal power. In some implementations, to ensure uniform power transmission from (e.g., all, different) antenna ports, a WTRU may scale down the power for transmission of the other SRS resources that may not be impacted by the power imbalance in (e.g., associated with) the antenna switching mechanism. In other words, the WTRU may transmit in SRS resources of a SRS resource set comprising one or more SRS resources impacted by a SRS power imbalance, wherein SRS transmission power is scaled down for other SRS resources of the SRS resource set than the impacted one or more SRS resources, e.g., to provide uniform power transmission between the SRS resources of the SRS resource set. For example, a WTRU may perform any of the following:
  (i) The WTRU may estimate the total SRS transmission power, for example, as defined by the power control process, $$P_{SRS,b,f,c}(i, q_s, l) = \min\left\{\begin{array}{l} P_{CMAX,f,c}(i), \\ P_{O\_SRS,b,f,c}(q_s) + 10\log_{10}(2^\mu \cdot M_{SRS,b,f,c}(i)) + \\ \alpha_{SRS,b,f,c}(q_s) \cdot PL_{b,f,c}(q_d) + h_{b,f,c}(i, l) \end{array}\right\}$$

where $P_{CMAX,f,c}(i)$ may be referred to herein as the WTRU configured maximum output power, $P_{O\_SRS,b,f,c}(q_s)$ may be referred to herein as the received target power, $M_{SRS,b,f,c}(i)$ may be referred to herein as an SRS bandwidth expressed in number of resource blocks for SRS transmission occasion, $PL_{b,f,c}(q_d)$ may be referred to herein as a downlink pathloss estimate in dB. Parameters $\mu$ and $\alpha_{SRS,b,f,c}$ (As) may be referred to herein as subcarrier spacing (SCS) and pathloss correction factors, respectively.
  (ii) The WTRU may initially divide the power equally over NsRs SRS antenna ports e.g., to have an equal power Pi (dB) per SRS port. For example, the WTRU may maintain a power level of Pi on the impacted SRS port(s). For example, the WTRU may reduce the power by x dB on the SRS ports, not-impacted by the loss, e.g., ($P_i$-X) dB.
  (iii) The WTRU may report (e.g., transmit information indicating) the incurred loss for the transmission.
  (iv) The WTRU may adjust the configured $P_{CMAX}$ dBm to ($P_{CMAX}$-$N_{SRS}$ x) dBm, where "$N_{SRS}$ x" represents the number of SRS antenna ports (NsRs) multiplied by the power reduction per antenna port, x.

In additional or alternative implementations, a WTRU may indicate (e.g., transmit information indicating) to the gNB application of the scaling to allow the gNB to account for the reduced transmitted power by the WTRU. Alternatively, or additionally, a WTRU may report (e.g., transmit information indicating) the incurred loss per SRS resource and may (e.g., also) indicate (e.g., transmit information indicating) the number of impacted SRS resources to the gNB. For example, a WTRU may compute the total power loss due to the scaling and may report (e.g., may transmit information indicating the computed total power) to the gNB. For example, the report (e.g., information) may be as part of (e.g., included in a) WTRU capability signaling (e.g., message). In another example, the report (e.g., information) may be included in an independent report (e.g., message) indicating a value related to the incurred loss. For example, in a WTRU where transmission of one of the $N_{SRS}$ SRS resources may incur x dB loss, a WTRU may perform any of the following:
  (i) The WTRU may report (e.g., transmit information indicating) the number of SRS resources impacted by the power loss. For example, the WTRU may also report (e.g., transmit information indicating) its index (e.g., an indication of the impacted SRS resource(s)).
  (ii) The WTRU may report (e.g., transmit information indicating) the total incurred loss, e.g., $N_{SRS\ X}$ dB, as the other power amplifiers (Pas) may reduce their power.
  (iii) The WTRU may report (e.g., transmit information indicating) its incurred loss by reporting (e.g., transmitting) a power headroom (PH) in a PH report (PHR).

In additional or alternative implementations, a WTRU may include the lost power due to scaling in its calculation of power headroom (PH). For example, a WTRU may reduce the PH according to the incurred loss (e.g., total power loss due to scaling).

For example, type 1 PH may be computed (in dB) according to the following equation:

$$PH_{type1b,f,c}(i,j,q_d,l) = P_{CMAX,f,c}(i) - \{P_{O\_PUSCHb,f,c}(j) + 10\log_{10}(2^\mu \cdot M_{RBb,f,c}^{PUSCH}(i)) + \alpha_{b,f,c}(j) \cdot PL_{b,f,c}(q_d) + \Delta_{TF,b,f,c}(i) + f_{b,f,c}(i,l)\}$$

For example, in a case where the WTRU did not adjust the $P_{CMAX}$ as described herein, e.g., to ($P_{CMAX}$-$N_{SRS\ X}$) dBm, the computed PH using the above equation may be adjusted (e.g., reduced) by (-$N_{SRS\ X}$) dB. In a case where the WTRU adjusted the $P_{CMAX}$, to ($P_{CMAX}$-$N_{SRS\ X}$) dBm, the WTRU may compute the PH using the above equation.

In yet another example, a WTRU may indicate (e.g., may transmit capability information indicating) its capability for power scaling of SRS resources that may not be impacted by the imbalance in the antenna switching mechanism. For example, after the WTRU may have indicated its capability, the WTRU may receive configuration information indicating whether to apply the power scaling or not.

In embodiments described herein, a (e.g., maximum) power (e.g., WTRU configured maximum output power) may be referred to herein as $P_{CMAX}$. For example, $P_{CMAX}$ may be determined for any of a cell, a frequency, a band, a cell group, and a BWP. For example, $P_{CMAX}$ may be determined for the WTRU as a whole. For example, $P_{CMAX}$ may be determined by a WTRU or a MAC-entity (e.g., of the WTRU).

For example, a WTRU may determine a value of $P_{CMAX}$ based on any of a WTRU power class max power and one or more reductions or allowed reductions such as for any of spectral emissions maximum power reduction (MPR), additional MPR (A-MPR) and power management MPR (P-MPR).

For example, a WTRU may determine (e.g., reduce) a value of a $P_{CMAX}$ based on an antenna imbalance that may be determined by the WTRU. The reduction may be referred to herein as deltaAI.

For example, a power headroom (PH) may be determined by a WTRU from a power calculation by the WTRU, such as a power calculation described herein and a $P_{CMAX}$ value. For example, PH may be determined as $P_{CMAX}$-P, where P may be a calculated power. For example, deltaAI may be included in the calculation (e.g., determination) of $P_{CMAX}$. For example, deltaAI may be included in the calculation of P.

For example, the WTRU may send a PH report (e.g., to any of a cell and a gNB) based on one or more triggers (e.g., conditions, events). A trigger (e.g., conditions, events) may include any of a pathloss change (e.g., greater than a threshold), a timer expiry, a P-MPR or MPE change (e.g., greater than a threshold), and SCell addition, etc.

In a case where the WTRU sends a PH report (PHR), the PHR may include (e.g., for each of one or more cells), any of: a PH value, a $P_{CMAX}$ value (e.g., the $P_{CMAX}$ value used for determining the PH), an indication of whether the PH is real or virtual, an indication of whether P-MPR has been applied (e.g., to the $P_{CMAX}$ value), an indication of whether a P-MPR value impacting the $P_{CMAX}$ value has been applied. For example, the PHR may (e.g., also) include (e.g., for each of one or more cells) an indication of whether a deltaAI has been applied (e.g., used) in the calculation (e.g., determination) of any of the PH value and the $P_{CMAX}$ value.

In a case where a deltaAI value is any of determined and applied to any of a power, a PH, and a $P_{CMAX}$, the WTRU may include any of the deltaAI and an indication related to applying deltaAI in the PHR. The indication may indicate that deltaAI may be applied, e.g., in any of the power, PH and $P_{CMAX}$ calculation (e.g., determination). For example, the indication may indicate the value of any of the deltaAI and a range of deltaAI values in which the deltaAI value may be comprised. For example, the indication may indicate to which antenna(s) or antenna port(s) the deltaAI may apply.

For example, the value of deltaAI (which may be in dB) may equal to or calculated (e.g., determined) as described for $N_{SRS\,X}$.

Example of WTRU-Based Selection of the Tx Dimension

According to embodiments, any number of coherent transmission groups may be any of used, determined, and configured for SRS transmission. The number coherent groups may be referred to herein as Nc. For example, a coherent transmission group may be any set of SRS antenna ports (e.g., Tx chains) which may be transmitting any of at the same time and the same uplink symbol. For example, a WTRU may transmit in Nc SRS transmission occasions and a coherent transmission group may be used in a (e.g., each) SRS transmission occasion.

For example, a coherent transmission group may include SRS antenna ports (e.g., Tx chains) that may be coherent (e.g., to each other).

For example, a (e.g., each) coherent transmission group may have an (e.g., associated) identifier (e.g., index) such as e.g., 1, 1, . . . Nc−1.

For example, a (e.g., each) coherent transmission group may have the same number of SRS antenna ports (e.g., Tx chains).

According to embodiments, a WTRU may be configured with a number of SRS transmission occasions (which may be referred to herein as Ns) with Nc coherent groups. For example, the number Ns of SRS transmission occasions may be any of configured and determined in a time window. For example, the time window may be any of periodic (e.g., regularly occurring), aperiodic, and semi-persistent.

According to embodiments, any of the following may be applicable:

In a case where the number of transmission occasions (Ns) is the same as the number of coherent transmission groups (Nc) e.g., Ns=Nc, the WTRU may use a coherent group for transmission in an (e.g., each) SRS transmission occasion e.g., in a non-overlapped manner.

In a case where the number of transmission occasions (Ns) is the same as the number of coherent transmission groups (Nc) e.g., Ns=Nc, a coherent transmission group index (e.g., identifier) may be determined based on e.g., an SRS transmission occasion number. For example, a coherent transmission group with a first coherent group index may be used for transmission in a first SRS occasion e.g., within a time window, and another coherent group with a second coherent group index may be used for transmission in a second SRS occasion e.g., within the time window, and so forth.

In a case where the number of transmission occasions (Ns) is lower than the number of coherent transmission groups (Nc) e.g., Ns<Nc, a WTRU may determine a subset of coherent transmission groups for SRS transmission based on any of a DL measurement, a (e.g., dynamic) indication and a maximum permitted exposure (MPE) related parameter.

In a DL measurement example, a WTRU may obtain (e.g., measure) a downlink signal quality through the Rx antennas associated with a (e.g., each) coherent transmission group and the WTRU may obtain (e.g., determine) a subset of coherent transmission groups based on the (e.g., measured) downlink signal quality. For example, the WTRU may obtain (e.g., determine, select) a subset of coherent transmission groups that may have the highest downlink signal quality. In another example, the WTRU may obtain (e.g., determine, select) a subset of coherent transmission groups that may have a downlink signal quality above a value. The downlink (e.g., measured) signal quality may be any of a reference signal received power (RSRP), a L1-RSRP, a Layer-1 signal to interference and noise ratio (L1-SINR), and a path loss (PL) signal quality. Any technique for obtaining a downlink signal quality, and for selecting any number of subsets of coherent transmission groups based on the downlink signal quality may be applicable to embodiments described herein.

In a (e.g., dynamic) indication example, in a case where a gNB triggers SRS transmission (e.g., any of aperiodic and semi-persistent SRS transmission), an associated DL control channel may indicate which subset(s) of coherent transmission groups may be used for transmission in the (e.g., any of configured and indicated) SRS transmission occasion.

In an MPE related parameter example, a WTRU may obtain (e.g., determine, select) a subset of coherent transmission groups based on the MPE related parameter (e.g., a coherent transmission group subset with less power back-off than another one may be selected).

In a case where the number of transmission occasions (Ns) is lower than the number of coherent transmission groups (Nc) e.g., Ns<Nc, a WTRU may use Ns coherent groups for transmission in Ns SRS transmission occasions. The Ns coherent groups may be obtained (e.g., determined), for example, with coherent group indexes in any of an increasing and decreasing order.

In a case where the number of transmission occasions (Ns) is lower than the number of coherent transmission groups (Nc) e.g., Ns<Nc, the (e.g., obtained, determined, selected) coherent transmission group may be indicated to the gNB based on any of the following examples:

In a first example, a (e.g., each) coherent transmission group may be associated with SRS parameter(s), such as e.g., any of an SRS sequence, a comb index, and a pattern. The WTRU may use a coherent group for transmission that may be obtained (e.g., determined) based on the associated SRS parameter(s). The gNB may (e.g., blindly) detect the determined (e.g., selected) coherent group based on the (e.g., used) SRS parameters.

In a second example, an (e.g., explicit) indication may be transmitted by the WTRU to indicate the (e.g., obtained, determined, selected) coherent transmission group, e.g., via the uplink control channel (e.g., PUCCH).

According to embodiments, the number of transmission occasions (Ns) may be obtained (e.g., determined) based on any of the following examples:
- In a first example, Ns may be obtained based on the antenna configuration of xTyR. For example, the Ns value may be determined based a combination of the antenna dimensions (x,y).
- In a second example, Ns may be obtained based on a (e.g., predefined, preconfigured, fixed) number (e.g., Ns=1).
- In a third example, Ns may be indicated via an associated downlink control information (DCI) (e.g., triggering SRS transmission).
- In a fourth example, Ns may be configured via a higher layer signal.
- In a fifth example, Ns may be obtained based on a codebook subset (or codebook) that may be configured for uplink transmission.

Figure 15:
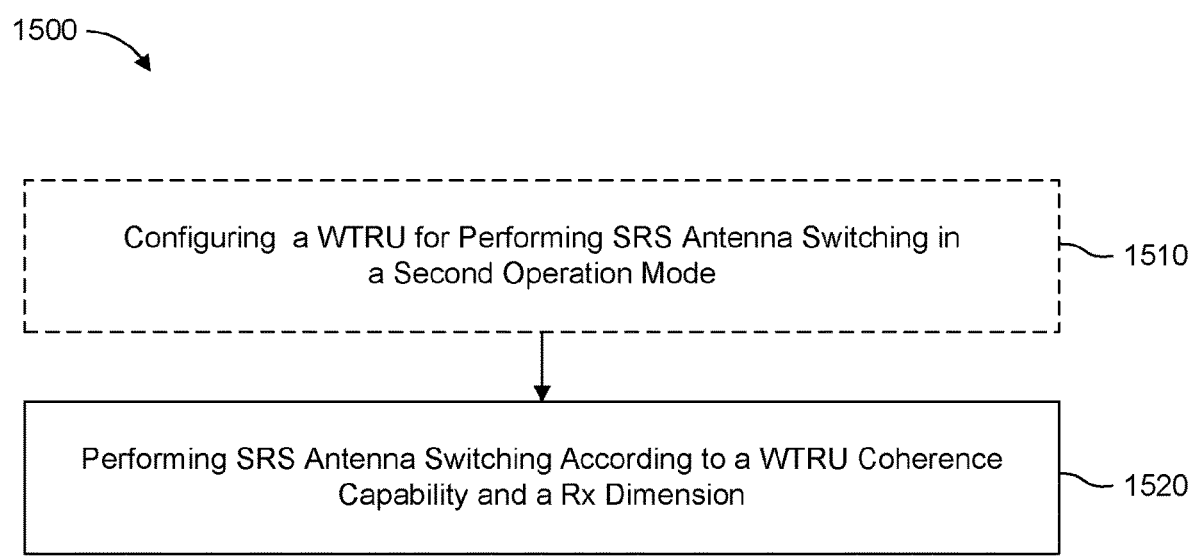
FIG. 15 is a diagram illustrating an example of a method for SRS antenna switching.

FIG. 15 is a diagram illustrating an example of a method 1500 for SRS antenna switching.

According to embodiments, the method may comprise performing SRS antenna switching in any of a first operation mode and a second operation mode. For example, the WTRU may be any of preconfigured and dynamically configured with any of the first and the second operation modes. For example, in a case where the WTRU is operating (e.g., configured) in the first operation mode, SRS antenna switching may performed according to a Tx dimension (e.g., the number of Tx chains) and a Rx dimension (e.g., the number of Rx chains/antennas) of the WTRU.

In an (e.g., optional) step 1510, a WTRU may be configured for performing SRS antenna switching in the second operation mode.

According to embodiments, in a step 1520, in the second operation mode, SRS antenna switching may performed according to a WTRU coherence capability and the Rx dimension.

For example, in the second operation mode, a subset of available Tx chains may be used for SRS transmission at a time.

For example, SRS antenna switching may be performed in the second operation mode for a second subset of Tx chains during an ongoing transmission in a first subset of Tx chains.

For example, the first and the second subsets of Tx chains may transmit in respectively a first and a second occasions which may be subsequent e.g., without being separated by a guard time.

For example, the WTRU coherence capability may indicate whether the WTRU may be any of a non-coherent (NC) WTRU, a partial-and-non-coherent (PNC) WTRU, and a full-and-partial-and-non-coherent (FPNC) WTRU.

For example, any of a NC and a PNC WTRU coherence capability may further include a number of coherent Tx chains lower than the Tx dimension.

For example, the method may further comprise transmitting an indication of the WTRU coherence capability for e.g., downlink channel estimation by e.g., a gNB.

For example, for any of a NC and a PNC WTRU, the subset of Tx chains may comprise (e.g., only) coherent Tx chains.

For example, for any of a NC and a PNC WTRU, the first subset of Tx chains may comprise (e.g., only) coherent Tx chains and the second subset of Tx chains may comprise (e.g., only) coherent Tx chains.

For example, the WTRU may be a FPNC WTRU.

For example, the WTRU may be configured with more than one SRS resource set, wherein a (e.g., each) SRS resource set may have (e.g., include) two or more SRS resources transmitted in different symbols, wherein a (e.g., each) SRS resource in a given set may include one or more SRS ports. For example, the WTRU may be configured to indicate (e.g., transmit information indicating) to a gNB its capability for performing antenna switching for a first subset of Tx chains when it may have (e.g., during) an ongoing transmission on a second subset of Tx chains. For example, the gNB may be configured to at least one of assume that Y=0 or query the WTRU whether Y=0, where Y may be a number of guard symbols between transmissions of SRS resources.

For example, the WTRU may be configured to indicate (e.g., transmit information indicating) to a gNB a power imbalance for compensation of an estimated channel at the gNB.

For example, the WTRU may be configured to ensure uniform power transmission by scaling down transmission power of one or more SRS resources to eliminate a difference in power between two or more SRS resources.

For example, the WTRU may be configured to at least one of (i) indicate to a gNB its application of the power scaling, and (ii) indicate to the gNB its capability to perform the scaling, wherein the WTRU may be configured to perform the scaling in response to a configuration received from the gNB.

Figure 19:
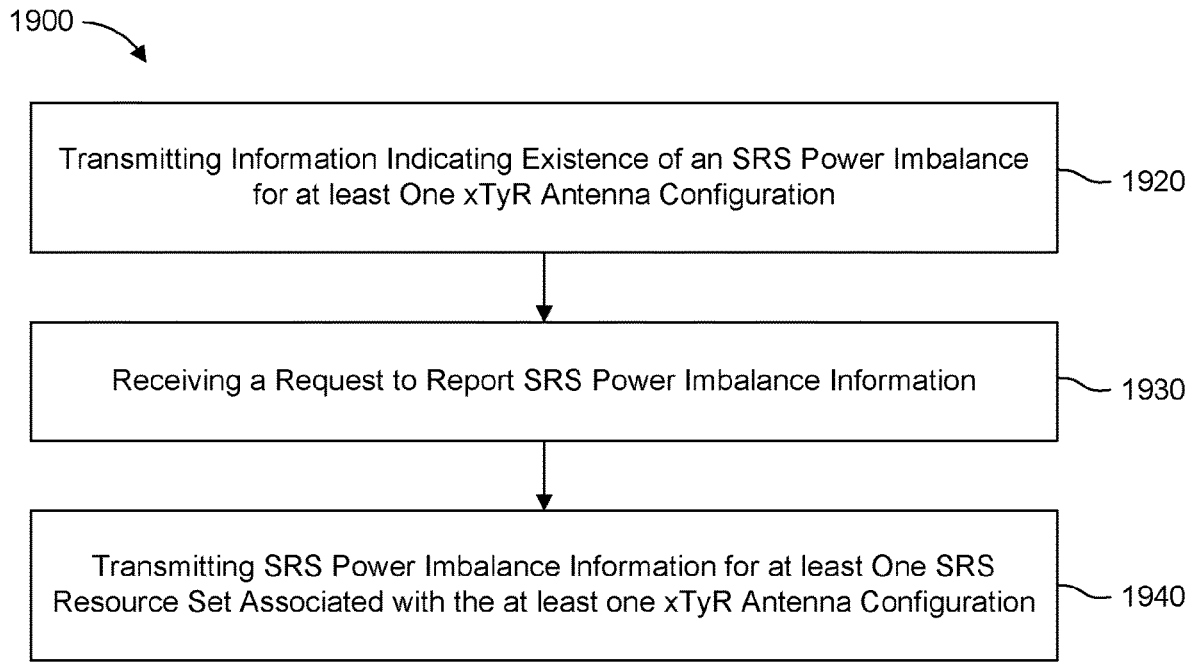
FIG. 19 is a diagram illustrating a second example of a method for WTRU-assisted SRS power imbalance compensation.

FIG. 19 is a diagram illustrating an example of a method 1900 for WTRU-assisted SRS power imbalance compensation. According to embodiments, the method 1900 may be implemented in a WTRU and may comprise transmitting 1920 information indicating existence of an SRS power imbalance for at least one transmit and receive (e.g., xTyR) antenna configuration e.g., in a set of (e.g., xTyR) antenna configurations (e.g., for SRS antenna switching). For example, the method 1900 may further comprise receiving 1930 a (e.g., message comprising information indicating a) request to report SRS power imbalance information. For example, the method 1900 may further comprise transmitting 1940 the SRS power imbalance information indicating, for at least one SRS resource set associated with the at least one (e.g., xTyR) antenna configuration (e.g., for SRS antenna switching), (i) one or more impacted SRS resources in the at least one SRS resource set and (ii) one or more power imbalance values for the one or more impacted SRS resources.

For example, the SRS power imbalance information may further indicate the at least one (e.g., xTyR) antenna configuration (e.g., for SRS antenna switching) that may be associated with the at least one SRS resource set.

For example, the SRS power imbalance information may further indicate a bandwidth part (BWP) that may be associated with the at least one SRS resource set.

For example, the indicated existence of an SRS power imbalance information may indicate that an SRS transmitted in the one or more impacted SRS resources may be transmitted at a lower power than a nominal power.

For example, the method 1900 may comprise (e.g., prior to transmitting the information indicating existence of an SRS power imbalance), receiving configuration information indicating the at least one SRS resource set associated with the at least one (e.g., xTyR) antenna configuration (e.g., for SRS antenna switching).

For example, the SRS power imbalance information may comprise a bitmap that may indicate the one or more impacted SRS resources in the at least one SRS resource set.

For example, the one or more power imbalance values for the one or more impacted SRS resources may comprise a value for a (e.g., each) impacted SRS resource. For example, the one or more power imbalance values may comprise different values for the different impacted SRS resources.

For example, the one or more power imbalance values may comprise a value for (e.g., all the, different) impacted SRS resources.

For example, the one or more power imbalance values may correspond to one or more values selected from a set of predetermined values.

For example, the at least one xTyR antenna configuration may comprise a coherent group of transmission (Tx) chains that may be associated with a subset of SRS resources of the at least one SRS resource set.

For example, the method 1900 may further comprise transmitting at least one SRS in the subset of SRS resources using the coherent group of Tx chains associated with the subset of SRS resources.

For example, the method 1900 may further comprise transmitting coherence (e.g., capability) information indicating a number of coherent groups of transmission (Tx) chains, e.g., for the set of xTyR antenna configurations.

For example, the coherence (e.g., capability) information may further indicate whether the WTRU is any of non-coherent (NC), partial-and-non-coherent (PNC), and full-and-partial-and-non-coherent (FPNC).

For example, the coherence capability information may further indicate a number of coherent groups of transmission (Tx) chains, e.g., for the set of xTyR antenna configurations.

For example, the method 1900 may further comprise associating a coherent group of Tx chains with a subset of SRS resources of the at least one SRS resource set.

For example, the method 1900 may further comprise transmitting the subset of SRS resources using the coherent group associated with the subset of SRS resources.

For example, the at least one SRS resource set may comprise three SRS resources, a (e.g., each) SRS resource comprising two SRS ports.

For example, the method 1900 may further comprise sequentially transmitting a first, a second and a third SRS respectively in a first, a second and a third SRS resource of the at least one SRS resource set, from respectively a first, a second and a third pair of antenna ports, according to the at least one xTyR antenna configuration associated with the at least one SRS resource set.

For example, the first and the third SRS may be transmitted using a first pair of Tx chains, and the second SRS may be transmitted using a second pair of Tx chains.

For example, the first pair of Tx chains may be switched from the third pair of antenna ports to the first pair of antenna ports while the second SRS is transmitted using the second pair of Tx chains from the second pair of antenna ports.

For example, the first and the second SRS may be sequentially transmitted e.g., without any guard time between them.

For example, the second and the third SRS may be sequentially transmitted e.g., without any guard time between them.

For example, the method 1900 may further comprise transmitting capability information indicating a capability of performing antenna switching for the first pair of Tx chains during an ongoing SRS transmission on the second pair of Tx chains.

Figure 20:
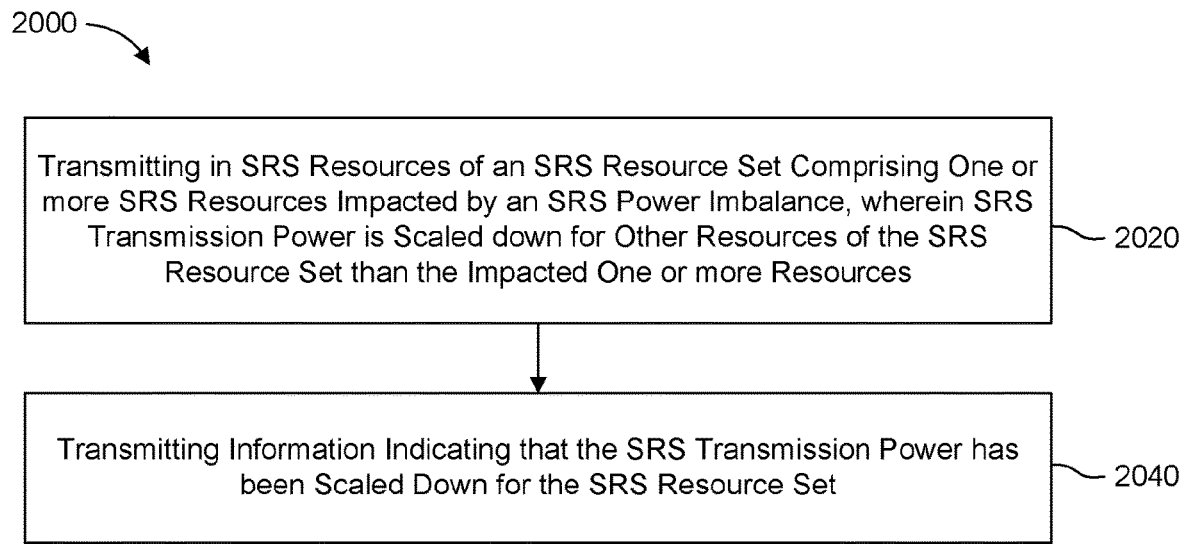
FIG. 20 is a diagram illustrating an example of a method for WTRU-based SRS power imbalance compensation.

FIG. 20 is a diagram illustrating an example of a method 2000 for WTRU-based SRS power imbalance compensation. According to embodiments, the method 2000 may be implemented in a WTRU and may comprise transmitting 2020 in SRS resources of an SRS resource set, wherein the SRS resource set may comprise one or more SRS resources impacted by an SRS power imbalance, and wherein SRS transmission power may be scaled down for other SRS resources of the SRS resource set than the impacted one or more SRS resources, for example, to provide uniform power transmission between the SRS resources of the SRS resource set. For example, the method 2000 may further comprise transmitting 2040 information indicating that the SRS transmission power may have been scaled down for the SRS resource set.

For example, a transmission in the impacted one or more SRS resources may be transmitted at a lower power than a nominal power.

For example, the transmitted information may further indicate a power loss for (e.g., each of) the impacted one or more SRS resources.

For example, the transmitted information may further indicate a number of the impacted one or more SRS resources.

For example, the transmitted information may further indicate one or more indexes (e.g., identifiers) of the impacted one or more SRS resources.

For example, the transmitted information may further indicate a total power loss due to the scaled SRS transmission power.

For example, the transmitted information indicating that the SRS transmission power has been scaled down, may be included in a power headroom.

For example, the power headroom may be reduced according to the total power loss. For example, the power headroom may be included in a power headroom report.

For example, the method 2000 may further comprise, prior to scaling down the SRS transmission power, transmitting capability information indicating a capability to scale down the SRS transmission power to provide uniform power transmission between the SRS resources of the SRS resource set.

For example, the method 2000 may further comprise receiving configuration information indicating to scale down the SRS transmission power for the other SRS resources of the SRS resource set than the impacted one or more SRS resources.

While not explicitly described, the present embodiments may be employed in any combination or sub-combination. For example, the present principles are not limited to the described variants, and any arrangement of variants and embodiments can be used.

Besides, any characteristic, variant or embodiment described for a method is compatible with an apparatus device comprising means for processing the disclosed method, with a device comprising a processor configured to process the disclosed method, with a computer program product comprising program code instructions and with a non-transitory computer-readable storage medium storing program instructions.

CONCLUSION

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM") mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (e.g., but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any UE recited herein, are provided below with respect to FIGS. 1A-1D.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used.

As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶ 6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

What is claimed is:

1. A method implemented by a wireless transmit/receive unit (WTRU), the method comprising:
   transmitting to a base station information indicating existence of a sounding reference signal (SRS) power imbalance for at least one transmit and receive (xTyR) antenna configuration in a set of xTyR antenna configurations;
   receiving from the base station a request to report SRS power imbalance information; and
   transmitting to the base station the SRS power imbalance information indicating, for at least one SRS resource set associated with the at least one xTyR antenna configuration, (i) one or more impacted SRS resources in the at least one SRS resource set and (ii) one or more power imbalance values for the one or more impacted SRS resources.

2. The method of claim 1, wherein the indicated existence of an SRS power imbalance indicates that an SRS transmitted in the one or more impacted SRS resources is transmitted at a lower power than a nominal power.

3. The method of claim 1, wherein the SRS power imbalance information indicates the at least one xTyR antenna configuration associated with the at least one SRS resource set.

4. The method of claim 1, wherein the SRS power imbalance information indicates a bandwidth part associated with the at least one SRS resource set.

5. The method of claim 1, comprising receiving configuration information indicating the at least one SRS resource set associated with the at least one xTyR antenna configuration.

6. The method of claim 1, wherein the SRS power imbalance information comprises a bitmap indicating the one or more impacted SRS resources in the at least one SRS resource set.

7. The method of claim 1, wherein the one or more power imbalance values for the one or more impacted SRS resources comprise a value for each impacted SRS resource.

8. The method of claim 1, wherein the one or more power imbalance values comprise a value for all the impacted SRS resources.

9. The method of claim 1, wherein the one or more power imbalance values correspond to one or more values selected from a set of predetermined values.

10. The method of claim 1, wherein the at least one SRS resource set comprises three SRS resources, each SRS resource comprising two SRS ports.

11. The method of claim 10, comprising sequentially transmitting a first, a second and a third SRS respectively in a first, a second and a third SRS resource of the at least one SRS resource set, from respectively a first, a second and a third pair of antenna ports according to the at least one xTyR antenna configuration associated with the at least one SRS resource set.

12. The method of claim 11, wherein the first and the third SRS are transmitted using a first pair of transmit (Tx) chains, and wherein the second SRS is transmitted using a second pair of Tx chains.

13. The method of claim 12, wherein the first pair of Tx chains is switched from the third pair of antenna ports to the first pair of antenna ports while the second SRS is transmitted using the second pair of Tx chains from the second pair of antenna ports.

14. The method of claim 11, wherein the first SRS, the second SRS, and the third SRS are sequentially transmitted without any guard time between them.

15. A wireless transmit/receive unit (WTRU) comprising circuitry, including any of a transmitter, a receiver, a processor and a memory, the WTRU being configured to:
   transmit to a base station information indicating existence of a sounding reference signal (SRS) power imbalance for at least one transmit and receive (xTyR) antenna configuration in a set of xTyR antenna configurations;
   receive from the base station a request to report SRS power imbalance information; and
   transmit to the base station the SRS power imbalance information indicating, for at least one SRS resource set associated with the at least one xTyR antenna configuration, (i) one or more impacted SRS resources in the at least one SRS resource set and (ii) one or more power imbalance values for the one or more impacted SRS resources.

16. The WTRU of claim 15, wherein the indicated existence of an SRS power imbalance indicates that an SRS transmitted in the one or more impacted SRS resources is transmitted at a lower power than a nominal power.

17. The WTRU of claim 15, wherein the SRS power imbalance information indicates the at least one xTyR antenna configuration associated with the at least one SRS resource set.

18. The WTRU of claim 15, wherein the SRS power imbalance information indicates a bandwidth part associated with the at least one SRS resource set.

19. The WTRU of claim 15, wherein the SRS power imbalance information comprises a bitmap indicating the one or more impacted SRS resources in the at least one SRS resource set.

20. The WTRU of claim 15, wherein the one or more power imbalance values for the one or more impacted SRS resources comprise a value for each impacted SRS resource.

* * * * *